United States Patent
Tran et al.

(10) Patent No.: US 10,643,249 B2
(45) Date of Patent: May 5, 2020

(54) CATEGORIZING DIGITAL CONTENT PROVIDERS

(71) Applicant: GOOGLE LLC, Mountain View, CA (US)

(72) Inventors: Thai Tran, Redwood City, CA (US); Dean Yasuda, Fremont, CA (US); Shashi Seth, Foster City, CA (US); Aaron Kwong Yue Lee, San Francisco, CA (US); Zheng Liu, Palo Alto, CA (US); Franck Chastagnol, Palo Alto, CA (US); George Strompolos, West Hollywood, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/054,999

(22) Filed: Aug. 3, 2018

(65) Prior Publication Data

US 2019/0306548 A1 Oct. 3, 2019

Related U.S. Application Data

(63) Continuation of application No. 14/322,493, filed on Jul. 2, 2014, now abandoned, which is a continuation (Continued)

(51) Int. Cl.
*G06Q 30/02* (2012.01)
*H04N 21/24* (2011.01)
(Continued)

(52) U.S. Cl.
CPC ......... *G06Q 30/0274* (2013.01); *G06Q 20/10* (2013.01); *G06Q 30/0251* (2013.01);
(Continued)

(58) Field of Classification Search
CPC ......... H04N 21/2407; H04N 21/25435; H04N 21/812; H04N 21/8358; G06Q 30/0251; G06Q 30/0272; G06Q 30/0273
See application file for complete search history.

(56) References Cited

U.S. PATENT DOCUMENTS

| | | | |
|---|---|---|---|
| 5,241,281 | A | 8/1993 | Wilkes et al. |
| 5,600,373 | A | 2/1997 | Chui et al. |

(Continued)

FOREIGN PATENT DOCUMENTS

| | | |
|---|---|---|
| GB | 2369203 | 5/2002 |
| GB | 2397904 | 8/2004 |

(Continued)

OTHER PUBLICATIONS

"Altnet Launches Global File Registry," P2P File Sharing, the Insider's Edition, Aug. 2003, 4 pages, [online] [retrieved on Mar. 14, 2012] Retrieved from the internet <URL:http://www.p2p-webloq.com/50226711/altnet launches alobal file reqistry.php>.

(Continued)

*Primary Examiner* — Pankaj Kumar
*Assistant Examiner* — Alexander Boyd
(74) *Attorney, Agent, or Firm* — Fish & Richardson P.C.

(57) ABSTRACT

The examples provide a content item distributor computing system that is configured to determine characteristics of content providers and providing content items to certain categories of content providers. In one embodiment, the content item distributor receives a request from a content provider to receive content items and determines if a provided set of video content has a minimum number of viewers and meets a standard for upload content. In response to the determination, the content item distributor communicates a content item to the video content provider to present in conjunction with video content.

20 Claims, 15 Drawing Sheets

Related U.S. Application Data of application No. 12/115,512, filed on May 5, 2008, now Pat. No. 8,924,270.

(60) Provisional application No. 60/927,940, filed on May 3, 2007.

(51) Int. Cl.

| | | |
|---|---|---|
| H04N 21/2543 | (2011.01) | |
| H04N 21/81 | (2011.01) | |
| H04N 21/8358 | (2011.01) | |
| G06Q 40/00 | (2012.01) | |
| G06Q 20/10 | (2012.01) | |
| G06Q 30/06 | (2012.01) | |

(52) U.S. Cl.
CPC ..... *G06Q 30/0272* (2013.01); *G06Q 30/0273* (2013.01); *G06Q 30/0277* (2013.01); *G06Q 30/06* (2013.01); *G06Q 40/00* (2013.01); *H04N 21/2407* (2013.01); *H04N 21/25435* (2013.01); *H04N 21/812* (2013.01); *H04N 21/8358* (2013.01)

(56) References Cited

U.S. PATENT DOCUMENTS

| | | |
|---|---|---|
| 5,634,012 A | 5/1997 | Stefik et al. |
| 5,664,018 A | 9/1997 | Leighton |
| 5,673,332 A | 9/1997 | Nishikawa et al. |
| 5,729,662 A | 3/1998 | Rozmus |
| 5,892,536 A | 4/1999 | Logan et al. |
| 5,918,223 A | 6/1999 | Blum et al. |
| 5,987,094 A | 11/1999 | Clarke et al. |
| 6,005,643 A | 12/1999 | Morimoto et al. |
| 6,091,822 A | 7/2000 | Mellows et al. |
| 6,222,807 B1 | 4/2001 | Min-Jae |
| 6,226,387 B1 | 5/2001 | Tewfik et al. |
| 6,233,682 B1 | 5/2001 | Fritsch |
| 6,407,680 B1 | 6/2002 | Lai et al. |
| 6,693,236 B1 | 2/2004 | Gould et al. |
| 6,760,536 B1 | 7/2004 | Amir |
| 6,768,518 B1 | 7/2004 | Bozdagi |
| 6,778,709 B1 | 8/2004 | Taubman |
| 6,810,388 B1 | 10/2004 | Sato |
| 6,871,200 B2 | 3/2005 | MacQueen et al. |
| 6,889,383 B1 | 5/2005 | Jarman |
| 6,898,799 B1 | 5/2005 | Jarman |
| 6,907,075 B2 | 6/2005 | Felts et al. |
| 6,968,175 B2 | 11/2005 | Raivisto |
| 6,976,165 B1 | 12/2005 | Carpentier et al. |
| 6,983,371 B1 | 1/2006 | Hurtado et al. |
| 7,020,635 B2 | 3/2006 | Hamilton et al. |
| 7,039,215 B2 | 5/2006 | Suzaki |
| 7,043,473 B1 | 5/2006 | Rassool et al. |
| 7,046,855 B2 | 5/2006 | Sad eh |
| 7,092,953 B1 | 8/2006 | Haynes |
| 7,099,849 B1 | 8/2006 | Reeder et al. |
| 7,181,438 B1 | 2/2007 | Szabo |
| 7,185,200 B1 | 2/2007 | Levine et al. |
| 7,212,330 B2 | 5/2007 | Seo et al. |
| 7,277,468 B2 | 10/2007 | Tian et al. |
| 7,343,025 B2 | 3/2008 | Seo et al. |
| 7,366,787 B2 | 4/2008 | Salas et al. |
| 7,369,677 B2 | 5/2008 | Petrovic et al. |
| 7,370,017 B1 | 5/2008 | Lindeman et al. |
| 7,409,060 B2 | 8/2008 | Nomizu et al. |
| 7,415,127 B2 | 8/2008 | Bodo et al. |
| 7,529,420 B2 | 5/2009 | Ii |
| 7,653,552 B2 | 1/2010 | Vaidyanathan et al. |
| 7,680,306 B2 | 3/2010 | Boutant et al. |
| 7,702,127 B2 | 4/2010 | Mihcak et al. |
| 7,707,224 B2 | 4/2010 | Chastagnol et al. |
| 7,724,917 B2 | 5/2010 | Isogai |
| 7,738,704 B2 | 6/2010 | Lienhart et al. |
| 7,742,619 B2 | 6/2010 | Kumar et al. |
| 7,817,861 B2 | 10/2010 | Lee |
| 7,882,177 B2 | 2/2011 | Wei et al. |
| 7,903,868 B2 | 3/2011 | Kim et al. |
| 7,936,824 B2 | 5/2011 | Lee |
| 8,019,737 B2 | 9/2011 | Kocsis et al. |
| 8,019,742 B1 | 9/2011 | Saluja et al. |
| 8,050,454 B2 | 11/2011 | Yi et al. |
| 8,073,828 B2 | 12/2011 | Bowden et al. |
| 8,085,995 B2 | 12/2011 | Yagnik |
| 8,090,624 B2 | 1/2012 | Reid et al. |
| 8,094,872 B1 | 1/2012 | Yagnik et al. |
| 8,166,012 B2 | 4/2012 | Reddy et al. |
| 8,184,953 B1 | 5/2012 | Covell et al. |
| 8,611,422 B1 | 12/2013 | Yagnik et al. |
| 8,745,647 B1* | 6/2014 | Shin ..................... H04N 21/442 725/10 |
| 2001/0010756 A1 | 8/2001 | Ogino |
| 2001/0034714 A1 | 10/2001 | Terao et al. |
| 2001/0046326 A1 | 11/2001 | Felts et al. |
| 2002/0001413 A1 | 1/2002 | Ratnakar |
| 2002/0009233 A1 | 1/2002 | Pesquet-Popescu |
| 2002/0038296 A1 | 3/2002 | Margolus et al. |
| 2002/0082731 A1 | 6/2002 | Pitman |
| 2002/0082999 A1 | 6/2002 | Lee et al. |
| 2002/0087885 A1 | 7/2002 | Peled et al. |
| 2002/0094135 A1 | 7/2002 | Caspi et al. |
| 2002/0112171 A1 | 8/2002 | Ginter et al. |
| 2002/0138291 A1 | 9/2002 | Vaidyanathan et al. |
| 2002/0150164 A1 | 10/2002 | Felts et al. |
| 2002/0165819 A1 | 11/2002 | McKnight et al. |
| 2002/0184223 A1 | 12/2002 | Miura |
| 2003/0004880 A1 | 1/2003 | Banjeree et al. |
| 2003/0028796 A1 | 2/2003 | Roberts et al. |
| 2003/0033254 A1 | 2/2003 | Tanaka |
| 2003/0037010 A1 | 2/2003 | Schmelzer |
| 2003/0046407 A1 | 3/2003 | Erickson et al. |
| 2003/0061490 A1 | 3/2003 | Abajian |
| 2003/0068087 A1 | 4/2003 | Wu |
| 2003/0095660 A1 | 5/2003 | Lee et al. |
| 2003/0099373 A1 | 5/2003 | Joo et al. |
| 2003/0123584 A1 | 7/2003 | Siegel et al. |
| 2003/0202660 A1 | 10/2003 | Zhou et al. |
| 2004/0003398 A1 | 1/2004 | Philip et al. |
| 2004/0010602 A1 | 1/2004 | Van Vleck et al. |
| 2004/0028138 A1 | 2/2004 | Piche et al. |
| 2004/0030615 A1 | 2/2004 | Ling |
| 2004/0111628 A1 | 6/2004 | Hirokazu et al. |
| 2004/0143667 A1 | 7/2004 | Jerome |
| 2004/0163106 A1 | 8/2004 | Schrempp et al. |
| 2004/0170335 A1 | 9/2004 | Pearlman et al. |
| 2004/0221118 A1 | 11/2004 | Slater et al. |
| 2005/0008190 A1 | 1/2005 | Levy et al. |
| 2005/0060542 A1 | 3/2005 | Hank et al. |
| 2005/0071604 A1 | 3/2005 | Tanner et al. |
| 2005/0080846 A1 | 4/2005 | McCleskey et al. |
| 2005/0105801 A1 | 5/2005 | Periaswamy |
| 2005/0125845 A1 | 6/2005 | Hardt et al. |
| 2005/0138145 A1 | 6/2005 | Schena et al. |
| 2005/0144141 A1 | 6/2005 | Nagao |
| 2005/0154680 A1 | 7/2005 | Schmelzer |
| 2005/0154892 A1 | 7/2005 | Mihcak et al. |
| 2005/0172312 A1 | 8/2005 | Lienhart et al. |
| 2005/0195975 A1 | 9/2005 | Kawakita |
| 2005/0213826 A1 | 9/2005 | Neogi |
| 2005/0216513 A1 | 9/2005 | Levy |
| 2005/0246752 A1 | 11/2005 | Liwerant et al. |
| 2006/0031870 A1 | 2/2006 | Jarman et al. |
| 2006/0034177 A1 | 2/2006 | Schrempp |
| 2006/0085816 A1 | 4/2006 | Funk et al. |
| 2006/0088224 A1 | 4/2006 | Lee |
| 2006/0098872 A1 | 5/2006 | Seo et al. |
| 2006/0106725 A1 | 5/2006 | Finley et al. |
| 2006/0110005 A1 | 5/2006 | Tapson |
| 2006/0110137 A1 | 5/2006 | Tsuda et al. |
| 2006/0114998 A1 | 6/2006 | Barrau |
| 2006/0120558 A1 | 6/2006 | Shi et al. |
| 2006/0167881 A1 | 7/2006 | Aydar et al. |
| 2006/0177198 A1 | 8/2006 | Jarman et al. |

(56) References Cited

U.S. PATENT DOCUMENTS

| | | |
|---|---|---|
| 2006/0187358 A1 | 8/2006 | Lienhart et al. |
| 2006/0195859 A1 | 8/2006 | Konig et al. |
| 2006/0195860 A1 | 8/2006 | Eldering et al. |
| 2006/0206486 A1 | 9/2006 | Strickland |
| 2006/0212927 A1 | 9/2006 | Riku et al. |
| 2006/0259359 A1 | 11/2006 | Gogel |
| 2006/0271947 A1 | 11/2006 | Lienhart et al. |
| 2006/0287916 A1 | 12/2006 | Starr et al. |
| 2006/0294571 A1 | 12/2006 | Moore et al. |
| 2007/0005556 A1 | 1/2007 | Ganti |
| 2007/0028308 A1 | 2/2007 | Nishio et al. |
| 2007/0047816 A1 | 3/2007 | Graham et al. |
| 2007/0058925 A1 | 3/2007 | Chiu |
| 2007/0073626 A1 | 3/2007 | Reeder et al. |
| 2007/0101360 A1 | 5/2007 | Gutta et al. |
| 2007/0106551 A1 | 5/2007 | McGucken |
| 2007/0124698 A1 | 5/2007 | Majumdar |
| 2007/0124756 A1 | 5/2007 | Covell et al. |
| 2007/0130580 A1 | 6/2007 | Covell et al. |
| 2007/0143219 A1 | 6/2007 | Shen et al. |
| 2007/0143778 A1 | 6/2007 | Covell et al. |
| 2007/0156726 A1 | 7/2007 | Levy |
| 2007/0180537 A1 | 8/2007 | He et al. |
| 2007/0203911 A1 | 8/2007 | Chiu |
| 2007/0211174 A1 | 9/2007 | Putterman et al. |
| 2007/0220575 A1 | 9/2007 | Cooper et al. |
| 2007/0230739 A1 | 10/2007 | Johnson et al. |
| 2007/0250901 A1* | 10/2007 | McIntire ............... G06Q 30/02 725/146 |
| 2007/0274571 A1 | 11/2007 | Hamza |
| 2007/0282472 A1 | 12/2007 | Seidman |
| 2007/0288518 A1 | 12/2007 | Crigler et al. |
| 2007/0294175 A1 | 12/2007 | Thelen |
| 2008/0040147 A1 | 2/2008 | Kim |
| 2008/0040235 A1* | 2/2008 | Avedissian ......... G06Q 30/0601 705/26.1 |
| 2008/0052783 A1 | 2/2008 | Levy |
| 2008/0059211 A1 | 3/2008 | Brock et al. |
| 2008/0059425 A1 | 3/2008 | Brock et al. |
| 2008/0059426 A1 | 3/2008 | Brock et al. |
| 2008/0059461 A1 | 3/2008 | Brock et al. |
| 2008/0059536 A1 | 3/2008 | Brock et al. |
| 2008/0065896 A1 | 3/2008 | Johnson et al. |
| 2008/0080756 A1 | 4/2008 | Periaswamy |
| 2008/0080771 A1 | 4/2008 | Periaswamy |
| 2008/0109306 A1 | 5/2008 | Maigret et al. |
| 2008/0109844 A1* | 5/2008 | Baldeschwieler ...... G06Q 30/02 725/35 |
| 2008/0127340 A1 | 5/2008 | Lee |
| 2008/0130944 A1 | 6/2008 | Johnson et al. |
| 2008/0155588 A1* | 6/2008 | Roberts ................. G06Q 30/00 725/34 |
| 2008/0159590 A1 | 7/2008 | Yi et al. |
| 2008/0163288 A1 | 7/2008 | Ghosal et al. |
| 2008/0172678 A1 | 7/2008 | Lee et al. |
| 2008/0178288 A1 | 7/2008 | Alperovitch et al. |
| 2008/0178302 A1 | 7/2008 | Brock et al. |
| 2008/0184117 A1* | 7/2008 | Alsbury ................. G06Q 30/02 715/719 |
| 2008/0209514 A1* | 8/2008 | L'Heureux ........ G06Q 30/0641 726/3 |
| 2009/0013414 A1 | 1/2009 | Washington et al. |
| 2009/0083228 A1 | 3/2009 | Shatz et al. |
| 2009/0083857 A1 | 3/2009 | Ueno et al. |
| 2009/0125310 A1 | 5/2009 | Lee et al. |
| 2009/0165031 A1 | 6/2009 | Li et al. |
| 2009/0324199 A1 | 12/2009 | Haitsma et al. |
| 2009/0327334 A1 | 12/2009 | Rodriguez et al. |
| 2009/0328125 A1 | 12/2009 | Gits et al. |
| 2009/0328228 A1 | 12/2009 | Schnell |
| 2009/0328237 A1 | 12/2009 | Rodriguez et al. |
| 2010/0082527 A1 | 4/2010 | Jain |
| 2010/0119105 A1 | 5/2010 | Mariya et al. |
| 2010/0125553 A1 | 5/2010 | Huang et al. |
| 2010/0182401 A1 | 7/2010 | Yoon et al. |
| 2011/0258049 A1 | 10/2011 | Ramer et al. |
| 2012/0123786 A1 | 5/2012 | Valin et al. |
| 2012/0136793 A1 | 5/2012 | Valin et al. |
| 2012/0173369 A1* | 7/2012 | Soroca .................. G06Q 30/02 705/26.3 |

FOREIGN PATENT DOCUMENTS

| | | |
|---|---|---|
| JP | 2001-256322 | 9/2001 |
| JP | 2002-032587 | 1/2002 |
| JP | 2002-063381 | 2/2002 |
| JP | 2002-334266 | 11/2002 |
| JP | 2003-058453 | 2/2003 |
| JP | 2003-242281 | 8/2003 |
| JP | 2003-242372 | 8/2003 |
| JP | 2005/056009 | 3/2005 |
| JP | 2006-072651 | 3/2006 |
| WO | 2001/93129 | 12/2001 |
| WO | 2002/011033 | 2/2002 |
| WO | 2002/082271 | 10/2002 |
| WO | 2002/103968 | 12/2002 |
| WO | 2003/046761 | 6/2003 |
| WO | 2005/060424 | 7/2005 |
| WO | 2006/007449 | 1/2006 |
| WO | 2006/015168 | 2/2006 |
| WO | 2006/077551 | 7/2006 |
| WO | 2007/033358 | 3/2007 |
| WO | 2007/076459 | 7/2007 |

OTHER PUBLICATIONS

"Archive pour Jan. 2007," Dailymotion the blog, Jan. 2007, [online] [Retrieved on Dec. 16, 2009] Retrieved from the internet <URL:http://bloq.dailymotion.com/2007/01/>.

"Cabinet Office Employing Punishment Against Unfair Acts Involved in Study Activities Using Competitive Study Funds, Such as Return of the Funds and Limitation of Applicant Eligibility," Chemical Industry Daily Report, Nov. 20, 2006, p. 10.

"Dailymotion brings content to the US (MotionMaker program)", Online Reporter, Jul. 14, 2007, p. 548, vol. 14 No. 1, [Retrieved from Dialog].

"Dailymotion Reports Global Implementation of Ina's Video Fingerprinting System," Wireless News, Oct. 21, 2007, [Retrieved from Dialog].

"Dailymotion, Skype partner to launch 'Mood Channels'," Online Reporter, Aug. 11, 2007, p. 552, vol. 30, No. 1, [Retrieved from Dialog].

"France—SFR boosts mobile content line-up," Tarifica Alert, Jul. 24, 2007, Phillips Business Information, [Retrieved from Dialog].

"Technical White Paper," Global File Registry, May 26, 2006, 20 Pages, [online] [retrieved on Mar. 14, 2012] Retrieved from the internet <URL:http://www.qlobalfilereqistry.com/assets/Global File Registry White Paper.pdf>.

"Wizzard Joins Dailymotion's MotionMaker Program," Wireless News, Dec. 19, 2007, [Retrieved from Dialog].

"Wizzard Partners with Dailymotion as Premium Content Provider," Wireless News, Dec. 13, 2007, [Retrieved from Dialog].

"Wizzard Signs on to Dailymotion's MotionMaker Program," Wireless News, Dec. 30, 2007, [Retrieved from Dialog].

"YouTube tied up with CBS, SONY BMG and UMG," ITmedia News, Japan, ITmedia Kabushikikaisha, Oct. 10, 2006, 1 page, Retrieved from the Internet <URL:http://www.itmedia.co.jp/news/articles/0610/1 Onews063. html>

Achul B; Bhandari A; Method of sharing revenue in on line advertising system, involves involking automated revenue sharing between host and publisher based on revenue sharing arrangement; Apr. 9, 2009; Thomson Reuters; Dec. 5, 2011 (Item 11 from file:350).

Baluja, Shumeet et al., Audio Fingerprinting: Combining Computer Vision & Data Stream Processing, IEEE International Conference on Acoustics, Speech and Signal Processing (ICASSP 2007), Apr. 15-20, 2007, pp. II-213-II-216, vol. 2.

(56) References Cited

OTHER PUBLICATIONS

Baluja, Shumeet et al., Content Fingerprinting Using Wavelets, 3rd European Conference on Visual Media Production, 2006, pp. 198-207.

Canada Patent Office, Office Action for CA Application No. 2,685,870, dated Feb. 19, 2015, 5 pages.

Chai, Y., et al., "A Novel Human Gait Recognition Method by Segmenting and Extracting the Region Variance Feature," The 18th International Conference on Pattern Recognition (ICPR'06), IEEE, 2006, 4 Pages.

Chastagnol F; Computer implemented content provider admitting method for content hosting website, involves inviting content provider into revenue sharing partner program responsive to determination made whether to invite provider into program; Nov. 6, 2008; Thomson Reuters; 14/5/1 (Item 1 from file: 350).

Chinese Office Action, Chinese Application No. 200780046460.6, dated Apr. 13, 2012, 21 pages.

Chinese Second Office Action, Chinese Application No. 200880020501.9, dated May 31, 2012, 13 pages.

Chum, Ondrej et al., Scalable Near Identical Image and Shot Detection, Conference on Image and Audio Video Retrieval, Proceedings of the 6th ACM International Conference on Image and Video Retrieval, 2007, pp. 549-556, ACM. N. Y., USA.

Cohen, E., "Dailymotion Launches Largest Independent Online Video Entertainment Site in the US; Dailymotion recruits executive team from MTV Networks and Time Warner to lead US and international efforts; team brings programming and management experience to Dailymotion. Dailymotion's programming team creates site specifically tailored to US audience," Dailymotion, Business Wire, Jul. 11, 2007.

Cohen, Edith et al., Finding Interesting Associations without Support Pruning, IEEE Transactions on Knowledge and Data Engineering, 2001, pp. 64-78, vol. 13, Issue 1.

Combined Search and Examination Report, UK Patent Application No. GB0805603.8, dated Jul. 17, 2008, 5 pages.

Communication pursuant to Article 94(3) EPC for European Patent Application No. 08780597.4, dated Jun. 11, 2013, 9 pages.

Communication pursuant to Article 94(3) EPC for European Patent Application No. EP 10187030.1, dated Apr. 24, 2013, 6 pages.

Communication pursuant to Article 94(3) EPC for European Patent Application No. EP 08737515, dated Mar. 5, 2013, 7 pages.

Communication Pursuant to Article 94(3) EPC Office Action for European Patent Application No. 08780597.4, dated Jun. 6, 2013, 9 pages.

Cotsaces, C., et al., "Video Indexing by Face Occurrence-Based Signatures," IEEE, ICASSP, 2006, pp. II-137-II-140.

Covell, Michele et al., Known-Audio Detection Using Waveprint: Spectrogram Fingerprinting by Wavelet Hashing, International Conference on Acoustics, Speech and Signal Processing (ICASSP—2007), 2007.

Decision of Rejection for Japanese Patent Application No. JP 2009-535496, dated Mar. 5, 2013, 6 Pages.

Definition of "Publisher", The Penguin English Dictionary, 2007, Credo Reference, 1 page, [online] [retrieved on Jul. 31, 2010] Retrieved from the internet URL: http://www.xreferolus.com/entrv/oenquinenq/publisher>.

European Search Report for European Patent Application No. EP 10187030, dated Dec. 15, 2010, 12 pages.

Examination Report for Australian Patent Application No. AU 2012201652, dated Oct. 3, 2013, 4 Pages.

Examiner's first report on Australian patent application No. AU 2007316477, dated Jul. 4, 2011, 4 pages.

Examiner's first report on Australian patent application No. AU 2011201035, dated Aug. 16, 2011, 1 pages.

Examiner's First Report on Patent Application No. AU 2008247347 dated Mar. 26, 2012, 3 Pages.

Extended Search Report for European Patent Application No. EP 07854581.1, dated May 31, 2013, 6 pages.

FAQ, for www.dailymotion.com, [Archived on Feb. 2, 2007] [online] [Retrieved on Dec. 16, 2009] Retrieved from the Internet <URL:http://web.archive.orq/web/*/http://www.dailymotion.com/faq>.

First Office Action for Canadian Patent Application No. 2,667,782, dated May 7, 2012, 3 pages.

First Office Action dated Jul. 27, 2011, for Chinese Patent Application No. CN 200880020501.9, 11 pages.

Gao Y; Liut; Liu Z; Wang P; Method for upgrading internet protoco business operating model for development of triple-network convergence, involves developing internet protocol TV operational control based on model of triple-network convergence; Nov. 2, 2012; Thomas Reuters; 14/5/1 (Item 1 from file:350).

Gargi, U., et al., "Solving the Label Resolution Problem with Supervised Video" MIR'08, Oct. 30-31, 2008, ACM, pp. 276-282.

Hampapur et al. "Comparison of Sequence Matching Techniques for video copy detection," Storage and Retrieval for Media Databases, SPIE, Ed. Col. 4676, 2001, 8 pages.

IT Media, Inc., "YouTube tied up with CBS, SONY BMG and UMG", ITmedia News, ITmedia x Kabushikikaisha, Japan, Oct. 10, 2006, 3 pages, can be retrieved at <URL:http://www.itmedia.co.jp/news/articles/0610/1Onews063.html>.

Jacobs, Charles E. et al., Fast Multiresolution Image Querying, International Conference on Computer Graphics and Interactive Techniques, Proceedings of the 22nd Annual Conference on Computer Graphics and Interactive Techniques, 1995, pp. 277-286, ACM, U.S.A Japanese Office Action, Japanese Application No. 2010-506717, dated Sep. 25, 2012, 8 pages.

Japanese Office Action, Japanese Application No. P2009-535496, dated Feb. 28, 2012, 13 pages.

Kishigami, J. et al., "Trend on Content Business," Report of Institute of Information Processing's Research, Institute of Information Processing, Nov. 18, 1999, pp. 37-42, vol. 99, No. 94.

Liu, Ting et al., Clustering Billions of Images with Large Scale Nearest Neighbor Search, 8th IEEE Workshop on Application of Computer Vision (WACV'07). Feb. 2007, 6 pages, U.S.A.

Metacafe, "Metacafe Help Blog: Metacafe's Producer Rewards® Program," Date unknown, [online] [Retrieved on Aug. 11, 2008] Retrieved from internet <URL:http://help.metacafe.com/?page_id=241 >.

Meyer, F., "Fast Adaptive Wavelet Packet Image Compression," IEEE Transactions on Image Processing, Apr. 1998, pp. 1-31.

Moulin, Pierre et al., Performance of Random Fingerprinting Codes Under Arbitrary Nonlinear Attacks, IEEE International Conference on Acoustics Speech and Signal Processing, Apr. 2007, pp. II-157-II-160, vol. 2, Issue 15-20.

Muhsen, et al., "Wavelet and Optimal Requantization Methodology for Lossy Fingerprint Compression," The International Arab Journal of Information Technology, Oct. 2011, pp. 1-5, vol. 8, No. 4.

Naphade et al. "A novel scheme for fast and efficient video sequence matching using compact signature," Storage and Retrieval for Media Databases, SPIE, Ed. vol. 3972, Jan. 2000, 9 pages.

Notice from European Patent Office dated Oct. 1, 2007 concerning business methods, Official Journal EPO, Nov. 2007, pp. 592-593.

Notice of Allowance for U.S. Appl. No. 12/115,512 dated Mar. 21, 2014, 12 Pages.

Notification of Board Opinion for Chinese Patent Application No. CN 200880020501.9, dated Jun. 26, 2015, 14 Pages.

Office Action for Canadian Patent Application No. CA 2,685,870 dated Mar. 14, 2012, 3 Pages.

Office Action for Japanese Patent Application No. P2009-535496, dated Sep. 24, 2013, 6 pages.

Office Action for U.S. Appl. No. 11/765,292, dated Dec. 9, 2011, 21 Pages.

Office Action for U.S. Appl. No. 11/765,292, dated Oct. 25, 2012, 23 Pages.

Office Action issued in Australian Application No. 2013270640 dated May 4, 2016, 5 pages.

Office Action issued in Canadian Application No. 2,685,870, dated Sep. 9, 2016, 6 pages.

Office Action issued in Chinese Application No. 200880020501.9, dated May 4, 2017, 11 pages (with English Translation).

(56) References Cited

OTHER PUBLICATIONS

Office Action issued in Canadian Application No. 2685870, dated Aug. 3, 2017, 7 pages.
Paris, J., et al., "Low Bit Rate Software Only Wavelet Video Coding" IEEE First Workshop on Multimedia Signal Processing, 1997, pp. 169-174.
Patent Examination Report No. 2 for Australian Patent Application No. 2008247347, dated Mar. 22, 2013, 5 pages.
Patent Examination Report No. 2 for Australian Patent Application No. AU2013201045, dated Apr. 9, 2015, 6 Pages.
Patent Examination Report No. 2 for Australian Patent Application No. AU2013270640, dated Jun. 1, 2015, 4 pages.
PCT International Search Report and Written Opinion, PCT/IB2008/000997, dated Aug. 3, 2009, 10 pages.
PCT International Search Report and Written Opinion, PCT/U52008/062713, dated Oct. 6, 2008, 13 pages.
PCT International Search Report and Written Opinion, PCT/US2007/083677, dated May 14, 2008, 8 pages.
PCT International Search Report and Written Opinion, PCT/US2008/062713, dated Oct. 6, 2008, 13 pages.
Producer Rewards Update, posted on Nov. 15, 2006, on http://blog.metacafe.com.
Revver, "Revver Video Sharing Network," 2008, [on line] [Retrieved on Aug. 11, 2008] Retrieved from the internet <URL:http://www.revver.com/qo/faq/>.
Sarkar, A., et al. "Video Fingerprinting: Features for Duplicate and Similar Video Detection and Query-based Video Retrieval" CitSeerX, Jan. 2008, vol. 6820, pp. 1-12.
Second Office Action for Chinese Patent Application No. CN 200780046460.6, dated Mar. 15, 2013, 6 pages.
Sumbera, J., et al. "Wavelet Transform using Haar Wavelets" MSOE CS-4802 Final Project Feb. 12, 2001, pp. 1-20.
Supplemental Notice of Allowance for U.S. Appl. No. 12/115,512 dated Apr. 21, 2014, 14 pages.
Supplementary European Search Report for European Patent Application No. EP 08780597 dated Mar. 30, 2012, 10 pages.
Supplementary European Search Report for European Patent Application No. EP 08737515, dated Dec. 13, 2010, 12 pages.
Swaminathan, Ashwin et al., Robust and Secure Image Hashing, IEEE Transactions on Information Forensics and Security, Jun. 2006, pp. 215-230, vol. 1, No. 2.
Sweetow, S., "YouTube generation: creating viral videos via user-generated content sites," EventDV, Jul., 2007, 20, 7, 28(6), [Retrieved from Dialog].
Terms of Use for Motion Maker Program, www.dailymotion.com [Archived on Feb. 12, 2007] [online] [Retrieved on Dec. 16, 2009] Retrieved from the Internet <URL: http://web.archive.org/web/20070212154953/http://www.dailymotion.com/register/motionmaker>.
Third Office Action for Chinese Patent Application No. CN 200780046460.6, dated Nov. 20, 2013, 6 pages.
Third Office Action for Chinese Patent Application No. CN 200880020501.9, dated Jul. 2, 2013, 11 Pages.
Toderici, G., et al., "Automatic, Efficient, Temporally Coherent Video Enhancement for Large Scale Applications" MM'09, Oct. 19-24, 2009 pp. 609-612.
U.S. Appl. No. 12/042,138, filed Mar. 4, 2008, 38 pages, (Copy not enclosed).
U.S. Appl. No. 12/237,397, filed Sep. 25, 2008, 34 pages, (Copy not enclosed).
U.S. Appl. No. 12/536,907, filed Aug. 6, 2009, 51 pages, (Copy not enclosed).
U.S. Appl. No. 12/569,827, filed Sep. 29, 2009, 56 pages, (Copy not enclosed).
U.S. Appl. No. 12/697,880, filed Feb. 1, 2010, 32 pages, (Copy not enclosed).
United States Office Action for U.S. Appl. No. 12/115,512, dated Apr. 24, 2012, 36 pages.
United States Office Action for U.S. Appl. No. 12/115,512, dated Apr. 16, 2013, 39 pages.
United States Office Action for U.S. Appl. No. 12/115,512, dated Jul. 20, 2010, 26 pages.
United States Office Action for U.S. Appl. No. 12/115,512, dated Oct. 16, 2013, 25 pages.
United States Office Action, U.S. Appl. No. 12/968,825, dated Apr. 12, 2012, 18 pages.
United States Office Action, U.S. Appl. No. 12/968,825, dated Aug. 6, 2012, 17 pages.
United States Office Action, U.S. Appl. No. 12/968,825, dated Oct. 7, 2011, 19 pages.
United States Office Action, U.S. Appl. No. 13/250,494, dated Mar. 29, 2012, 23 pages.
Wandelmer. "Synchronized digital video subsampling to achieve temporal resolution independence," IEEE International Symposium on Industrial Electronics, Jun. 4-7, 2007, 6 pages.
Yagnik, J., et al., "A Model Based Factorization Approach for dense 3D recovery from Monocular Video" Proc. of the Seventh IEEE International Symposium of Multimedia, 2005, pp. 1-4.
Yagnik, J., et al., "Learning People Annotation from the Web via Consistency Learning" MIR'07, Sep. 28-29, 2007, ACM, pp. 285-290.
Yuan et al. "Fast and Robust Search Method for Short Video Clips from Large Video Collection," IEEE Proceedings of the 17th International Conference on Pattern Recognition, Aug. 26, 2004, 4 pages.
CA Office Action in Canadian Application No. 2685870, dated Jun. 27, 2019, 9 pages.

\* cited by examiner

FIG. 7

YouTube - Partner Programme - Mozilla Firefox

File  Edit  View  History  Bookmarks  Tools  Help

Personal Information

First name: [Joe] — 713
Last Name: [User] *
Date of Birth (yyyy-mm-dd): [1970] [Jan ▼] [01 ▼] * You must be 18 years of age or older to become a partner.

Business Information

Company name: [?]
Company Web Site: [?]
Country/Region: [United States ▼] * We are currently accepting applications from residents of the US, Canada, and the UK.

Additional YouTube User Accounts

Linked YouTube user accounts [?]  ☐ I have additional YouTube user accounts which I would like to include in this partnership application

Video Information

How many videos have you created/produced?: [11 to 30 videos ▼] *
What is the average length of your videos?: [5 to 15 minutes ▼] *
Category that best describes your content?: [Comedy ▼] *
How often do you create and upload new videos?: [More than once a week ▼] *
If your videos are NOT on YouTube, enter the URL where your videos are published online.: [?]

Tell us why you want to join the partner programme:

[I have been a member of the YouTube community since 2006. I have uploaded more than 200 original videos and my channel has over 2000 subscribers. I would like to join the Partner Program so I can earn revenue from my work.] — 711

[Review Application] — 715

Done — 701

Video Info View

Views: Business History Personal Video Info Video Score Video Stats

Rows 1 to 4 shown (4 total rows). Sorted by: [1]Final Score.

Change status for checked applicants to: | Invited ▾ | Update Applicants

| Username [?] | Type [?] | Status [?] | Date [?] | Status Region | Strikes Ok [?] | [1] Final Score [?] | Video Count | Video Length | Video Create | Video Category | Video Web Site |
|---|---|---|---|---|---|---|---|---|---|---|---|
| mrfox1 | C | P ☑ | Unknown | US | Y,0,0 | 0.33 | 1-10 | 1-5 | 24/year | Film & Animation | |
| akylee05 | C | P ☑ | 2008-02-25 | US | Y,0,0 | 0.25 | 1-10 | 1-5 | 24/year | Science & Technology | |
| joeuser | C | P ☑ | Unknown | US | Y,0,0 | 0.00 | 11-30 | 5-15 | 104/year | Comedy | |
| thaijp2 | C | P ☐ | 2008-02-26 | GB | Y,0,0 | 0.00 | 11-30 | 15-30 | 52/year | Autos & Vehicles | |

CATEGORIZING DIGITAL CONTENT PROVIDERS

CROSS REFERENCE TO RELATED APPLICATIONS

This application is a continuation of and claims priority to U.S. patent application Ser. No. 14/322,493, filed Jul. 2, 2014, and entitled "Monetization of Digital Content Contributions," which is a continuation of U.S. patent application Ser. No. 12/115,512, filed on May 5, 2008, and entitled "Monetization of Digital Content Contributions," now U.S. Pat. No. 8,924,270 issued on Dec. 30, 2014, which claims the benefit of U.S. Provisional Application 60/927,940, filed May 3, 2007. The complete disclosure of the above-identified priority applications is hereby fully incorporated herein by reference.

TECHNICAL FIELD

The examples described herein provide a content item distributor configured to categorize video content providers. In particular, the examples are directed towards determining characteristics of content providers and providing content items to certain categories of content providers.

BACKGROUND

Content item distributors provide content items to video content providers to be presented to users with electronic documents or videos. The content item distributors determine which video content providers should receive content items. The content items may be presented before, after, or in conjunction with the electronic documents or videos.

SUMMARY

The present examples of the technology provide methods and systems that enable content item distributors to categorize video content providers. Content item distributors receive a request from a provider of video content to receive content items to present in conjunction with video content presented by the video content provider and analyzes a set of video content presented by the video content provider. The content item distributor determines if the set of video content has a minimum number of viewers and meets a standard for upload content. In response to determining that the set of video content has the minimum number of viewers and meets the standard for upload content and originality, the content item distributor communicates a content item to the video content provider to present in conjunction with video content.

In order for a video digital content provider to participate in receiving content items to be presented with the digital content, the content provider submits an application to become a revenue sharing partner. The application is analyzed by an application analysis module to determine whether the video content provider is eligible to receive content items based at least in part on the number of violations that the video content provider has received in addition to an application score. Alternatively, the content item distributor invites content providers to receive content items based at least in part on an applicant's pre-score.

Once a video content provider has been approved, the video content provider can determine which of their already-uploaded digital content items will be submitted for receiving content items. Alternatively, the video content provider can specify that digital video content will be submitted during the initial upload of the digital content item to the content item distributor.

In one embodiment, the analysis module receives the request for monetization associated with the video content provider's digital video content and determines whether the digital video content is eligible. The determination whether digital video content is eligible is based at least in part on various criteria including whether the digital video content includes only original content. Once digital video content has been approved, content items stored in a content item database are displayed in conjunction with the digital video content.

The features and advantages described in this summary and the following detailed description are not all inclusive. Many additional features and advantages will be apparent to one of ordinary skill in the art in view of the drawings, specification and claims hereof.

BRIEF DESCRIPTION OF THE DRAWINGS

FIGS. 6-8 illustrate examples of user interfaces that are used by content providers during the application process to become a revenue sharing partner in accordance with one embodiment of the present invention.

FIG. 9 illustrates an example user interface that is used by a system administrator to assist in reviewing information regarding content providers who have requested to become a revenue sharing partner in accordance with one embodiment of the present invention.

FIG. 10 illustrates an example of a user interface that informs content sharing partners of important information of the revenue sharing partner program in accordance with one embodiment of the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
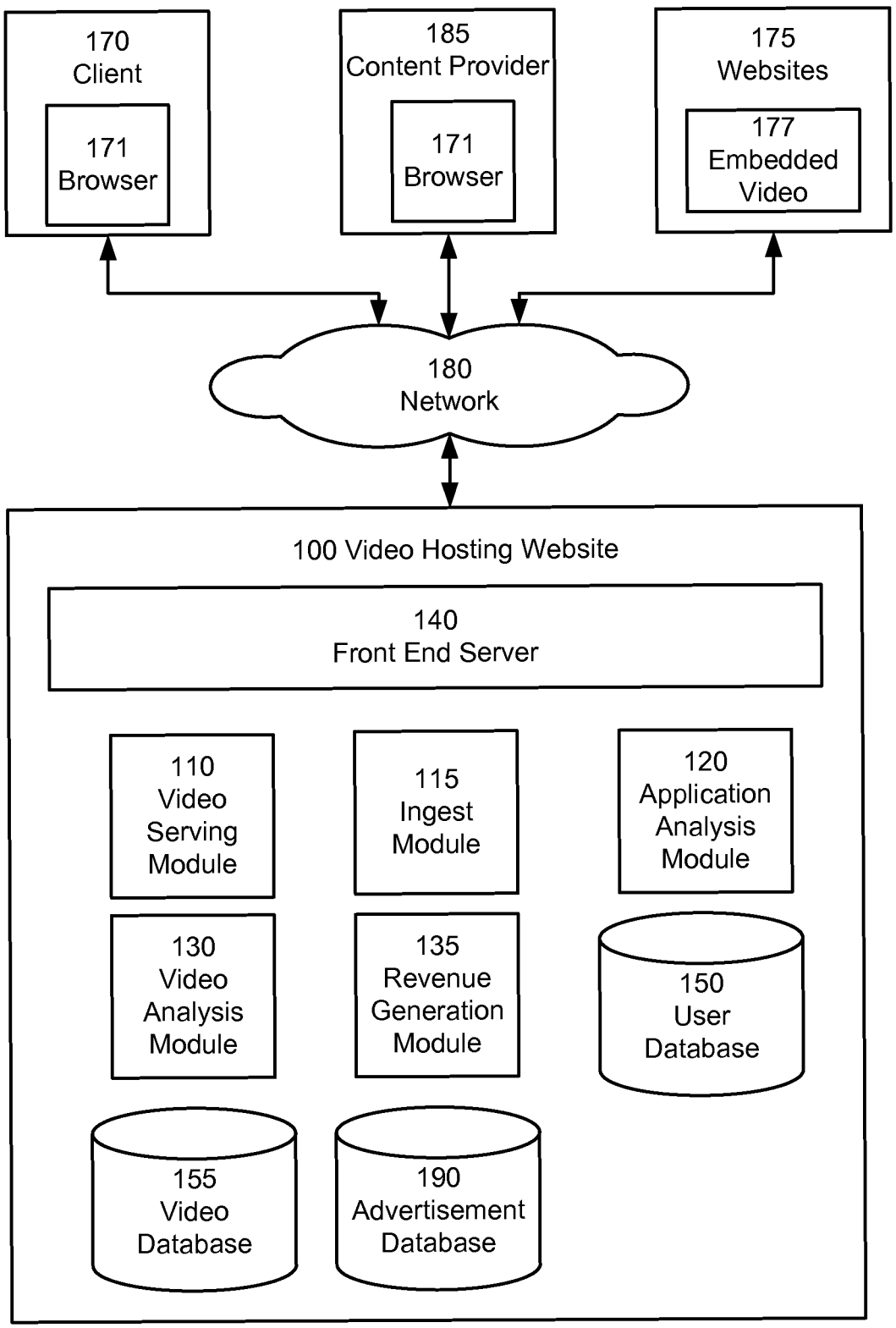
FIG. 1 is a block diagram of the system architecture of one embodiment of the present invention.

Referring now to FIG. 1, there is shown a system architecture of an embodiment of a video hosting website 100 in accordance with one embodiment of the present invention. In certain examples, the video hosting website may be the content item distributor. As shown in FIG. 1, the video hosting website 100 comprises a video serving module 110, an ingest module 115, an application analysis module 120, a video analysis module 130, a revenue generation module 135, a front end server 140, a user database 150, a video database 155 and an advertisement database 190. Many conventional features, such as firewalls, load balancers, application servers, failover servers, site management tools and so forth are not shown so as not to obscure the features of the system. A suitable website for implementation of the system is the YOUTUBE™ website, found at www.youtube.com; other video hosting sites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The server is implemented as server program executing on server-class computer comprising a CPU, memory, network interface, peripheral interfaces, and other well known components. The computers themselves preferably run an open-source operating system such as LINUX, have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage mediums (e.g., RAM, hard disk, or optical/magnetic media).

A client 170 executes a browser 171 to view digital content items and can connect to the front end server 140 via a network 180, which is typically the internet, but can also be any network, including but not limited to any combination of a LAN, a MAN, a WAN, a mobile, wired or wireless network, a private network, or a virtual private network. While only a single client 170 and browser 171 are shown, it is understood that very large numbers (e.g., millions) of clients are supported and can be in communication with the video hosting website 100 at any time. The client 170 may include a variety of different computing devices. Examples of client devices 170 are personal computers, digital assistants, personal digital assistants, cellular phones, mobile phones, smart phones or laptop computers. As will be obvious to one of ordinary skill in the art, the present invention is not limited to the devices listed above.

The browser 171 can include any application that allows users of client 170 to access web pages on the World Wide Web. Suitable applications are Microsoft Internet Explorer, Netscape Navigator, Mozilla Firefox, Apple Safari or any application adapted to allow access to web pages on the World Wide Web. The browser 171 can also include a video player (e.g., Flash™ from Adobe Systems, Inc.), or any other player adapted for the video file formats used in the video hosting website 100. Alternatively, videos can be accessed by a standalone program separate from the browser 171. A user can access a video from the video hosting website 100 by browsing a catalog of videos, conducting searches on keywords, reviewing play lists from other users or the system administrator (e.g., collections of videos forming channels), or viewing videos associated with particular user groups (e.g., communities).

A content provider 185 is an entity that owns or controls at least some of the rights to a particular work, such as a video content provider. The content provider 185 may be an individual, a group of individuals, or an entity such as a music or video production company or studio or artists' group. The content provider 185 is responsible for providing digital content items to the video hosting website 100 via the network 180. The content provider 185 determines digital content items that should be uploaded to the video hosting website 100 and that may be eligible to generate revenue on the video hosting website 100. Additionally, the content provider 185 may also upload digital content items to the video hosting website 100 regardless of whether the digital content items are eligible to generate revenue. While only one content provider 185 is shown, it is understood that any number of content providers are supported and can be in communication with the video hosting website 100 at any time. Additionally, content provider 185 may be referred to below as a "revenue sharing partner."

The uploaded digital content items can include, for example, video, audio or a combination of video and audio. Alternatively, a digital content item may be a still image, such as a JPEG or GIF file or a text file. For purposes of convenience and the description of one embodiment, the uploaded digital content items will be referred to as a "video," "video files," or "video items," but no limitation on the type of digital content items that can be uploaded are indented by this terminology. Thus, the operations described herein for enabling monetization of a digital content item can be applied to any type of digital content, non only videos; other suitable types of digital content items include audio files (e.g. music, podcasts, audio books, and the like), documents, websites, images, multimedia presentations, and so forth.

As previously mentioned, users of clients 170 execute a browser 171 and connect to the front end server 140 to view the videos that have been uploaded from the content providers 185. Users of client 170 can search for videos based on keywords, tags or other metadata. These requests are received as queries by the front end server 140 and provided to the video serving module 110, which is responsible for searching the video database 155 for videos that satisfy the user queries and providing the videos to the users. The video serving module 110 supports searching on any fielded data for a video, including its title, description, tags, author, category and so forth. Alternatively, users can browse a list of videos based on categories such as most viewed videos, sports, animals, or automobiles. For example, the user may browse a list of videos related to cars and select which videos from the list to view.

While viewing a video on the video hosting website 100, a user may also be shown a web advertisement in conjunction with the video if the video has been enabled for monetization. The advertisement database 190 is responsible for storing web advertisements that are associated with videos that have been enabled for monetization. Through viewer interaction with the web advertisement, the content provider 185 associated with the video receives a share of the revenue generated by the advertisement. The revenue generation module 135 is responsible for tracking revenue that content providers 185 generate from web advertisements placed in conjunction with their monetized videos. Videos that have been enabled for monetization may also be shown as embedded videos 177 on websites 175 other than the video hosting website 100.

In an alternative embodiment, users of client 170 can also upload digital content items to the video hosting website 100 which may be eligible to generate revenue on the video hosting website 100. For ease of discussion, only content providers 185 are responsible for uploading digital content items though users of client 170 can also upload digital content items to the video hosting website 100.

To upload videos to the video hosting website 100, a content provider 185 connects to the front end server 140 via the network 180. The uploaded videos are processed by an ingest module 115, which processes the videos for storage in the video database 155. This processing can include format conversion (transcoding), compression, metadata tagging, and other data processing. The ingest module 115 processes the videos in order to standardize content for playback to users of client 170. This enables the video hosting website 100 to receive uploaded videos of various formats, while still being able to provide a standardized output to users. An uploaded video file is associated with the content provider 185 and the content provider's account record is updated in the user database 150 as needed.

The video database 155 is used to store the ingested videos. The video database 155 stores video content and associated metadata provided by their respective content owners. Each uploaded video is assigned a video identifier (id) when it is processed by the ingest module 115. The video files have metadata associated with each file such as a video ID, artist, video title, label, genre, time length, and optionally geo-restrictions that can be used for data collection or content blocking on a geographic basis.

The user database 150 is responsible for maintaining a record of all registered users of the video hosting website 100. Registered users include content providers 185 and/or users who simply view videos on the video hosting website 100. Each content provider 185 and/or individual user registers account information including login name, electronic mail (e-mail) address and password with the video hosting website 100. This account information is stored in the user database 150. Additionally, the user database 150 stores each user's infraction information indicating the number of received violations, type of violations and date of the violation. Infractions are violations of the rules of conduct of the video hosting website 100 as further discussed below. The user database 150 also stores a record of every video that each content provider 185 has uploaded to the video hosting website 100.

The application analysis module 120 is responsible for analyzing requests from content providers 185 to become revenue sharing partners. Revenue sharing partners receive shared revenue from their uploaded videos and are considered independent video creators who are seeking online distribution of their videos. Generally, revenue sharing partners create original videos which generate a large amount of traffic (i.e., users viewing videos) on the video hosting website 100. Original videos are videos that are entirely of content that the content provider 185 associated with the video have created. Examples of original videos that would be eligible for monetization are further described below in regard to the video monetization process.

Revenue sharing partners receive a share of the revenue generated from ad impressions occurring when videos that have been enabled for monetization are viewed by users of the video hosting web site 100. In one embodiment, a content provider 185 submits an application to the video hosting website 100 to become a revenue sharing partner. The front end server 140 forwards the application to the application analysis module 120 which analyzes the application to determine whether the content provider 185 is eligible to become a revenue sharing partner.

Once the content provider's request to become a revenue sharing partner has been granted, the user's account information is updated in the user database 150 to indicate that the content provider 185 is now a revenue sharing partner. For ease of discussion, content providers 185 that have become eligible to receive shared revenue associated with their videos will be called a "revenue sharing partner" or "revenue sharing partners."

Revenue sharing partners may elect to monetize videos during an initial upload to the video hosting website 100 or may monetize videos that have been previously uploaded. The video analysis module 130 is responsible for analyzing the videos that have been submitted for monetization. In one embodiment, the video analysis module 130 checks the video across reference sources to assist in the determination that the content included in the video is original material. Systems and methods for matching uploaded digital content items against reference content are known, and some are described for example in U.S. patent application Ser. Nos. 11/765,292 and 11/746,339, each of which is incorporated by reference herein in its entirety. In one embodiment, once a video has been determined to be original, the video is further analyzed based on criteria such as popularity to determine whether the video should be monetized, as further described below in the video monetization process.

Revenue Sharing Partner Application Process

The revenue sharing partner application process is performed by the application analysis module 120 to determine whether a content provider 185 is eligible to become a revenue sharing partner. As previously discussed, a revenue sharing partner receives a share of the revenue generated from ad impressions occurring when monetized videos associated with the revenue sharing partner are viewed by users of the video hosting website 100.

Figure 2:
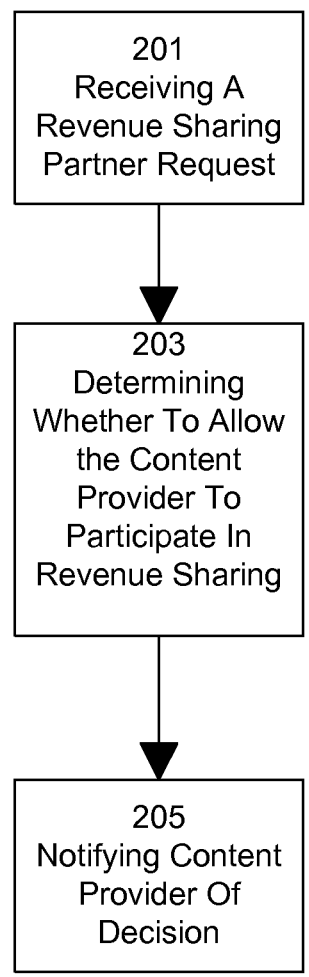
FIG. 2 illustrates a method for promoting a content provider to a revenue sharing partner in accordance with one embodiment of the present invention.

Referring now to FIG. 2, the revenue sharing partner application process according to one embodiment has the following functional stages:

201: Receiving a revenue sharing partner request;
203: Determining whether to allow the content provider to participate in revenue sharing; and
205: Notifying content provider of decision.

Figure 6:
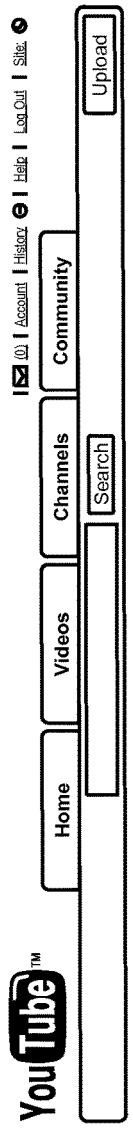

The first stage 201 is a process repeated for every content provider 185 who decides to participate in revenue sharing of their videos. Generally, in the first stage 201 the application analysis module 120 receives a revenue sharing partner request from a content provider 185. Referring to FIG. 6, there is shown one embodiment of a user interface that provides information about the revenue sharing partner program to a content provider interested in receiving shared revenue for his or her uploaded videos. The content provider 185 views an information web page 601 of the revenue sharing partner program that informs the content provider 185 of the benefits of becoming a revenue sharing partner and the qualifications needed to become a revenue sharing partner. The content provider reviews the information web page 601 and if the content provider 185 is interested in becoming a revenue sharing partner, the content provider clicks on the apply now button 603 which directs the content provider to a web page containing a revenue sharing application.

Referring to FIG. 7, there is shown a web page containing the revenue sharing partner application 701. The content provider 185 enters information into data entry fields of the revenue sharing partner application 701 which will be analyzed to determine whether to allow the content provider 185 to become a revenue sharing partner. The content provider 185 provides personal information 703 such as their first and last name and their date of birth along with business information 705 such as their company name and/or website. The content provider 185 must also provide information regarding other accounts on the video hosting website 100 that should be included in the revenue sharing partner application 701. Generally, the content provider 185 is not required to provide information for every category. The required data entry fields are donated by an asterisk 713 or any other graphical symbol to indicate that the video hosting website 100 requires content providers 185 to provide information pertaining to the particular data entry field in order to complete the revenue sharing partner application 701.

Required fields include the content providers 185 first and last name along with their date of birth, for example. In one embodiment, content providers 185 must be 18 years of age or older to become a revenue sharing partner. Additionally, the content providers 185 must provide their country of residence as in one embodiment, only revenue sharing applications from defined geographic areas are acceptable.

One of the most important required fields pertains to the video information 707 section. Content providers 185 are required to express the amount of videos that they have created or produced. In one embodiment, content providers 185 specify a range of videos that they have created/produced from a pull down menu such as 11 to 30 videos, for example. Alternatively, content providers 185 can manually provide an exact number or estimate of created/produced videos.

A content provider is also required to indicate how often he/she creates and uploads new videos. The number of videos created/produced and frequency of uploads associated with the content provider 185 is important as this is a strong indication of the amount of viewing traffic (i.e., from users of the video hosting website 100) that the content provider 185 may generate. Additionally, the miscellaneous information pertaining to the content provider's videos is also required such as the average length of the content providers' 185 videos and the category that best describes the videos such as comedy, automobiles, nature, or instructional videos. Through statistical analysis of the amount of revenue generated in the past regarding videos of a particular category, the category information is important as a precedent may be set that videos in a particular category typically provide the most revenue. For example, a pattern may have developed that content providers 185 who upload videos categorized as comedy generally generate the most revenue in the video hosting website 100. Thus, the category information is important as it indicates the amount of revenue that content providers 185 may potentially generate.

Additionally, though not required, content providers 185 are allowed to give a written explanation of why they want to join the revenue sharing partner program. Content providers leave their explanation in an explanation box 711 giving their reasoning. For example, a content provider 185 may leave the explanation stating "I have been a member of the YouTube community since 2006. I have uploaded more than 200 original videos and my channel has over 2000 subscribers. I would like to join the Partner Program so I can earn revenue for my work." In one embodiment, the written explanation is manually reviewed by a system administrator or person associated with the video hosting website 100 to assist in determining whether the content provide 185 should be allowed to become a revenue sharing partner. Alternatively, the application analysis module 120 may parse the explanation for meaningful keywords or phrases in the text such as "uploaded more than 200 original videos" or "member since 2006." These keywords or phrases can later be analyzed to assist in the revenue sharing partner application process.

Figure 8:
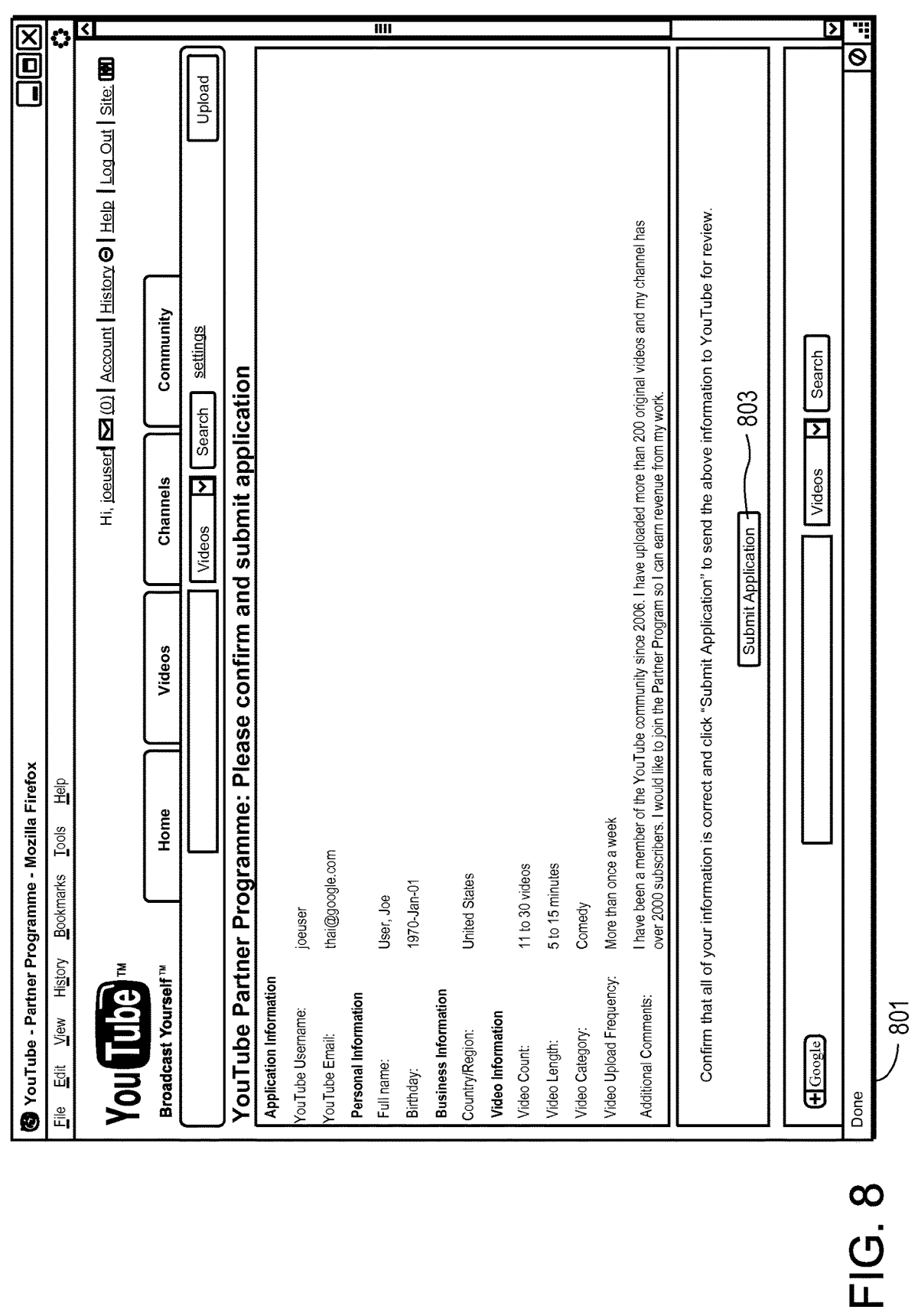

Once the content provider 185 has answered all the required data entry fields in the revenue sharing partner application 701, the content provider 185 clicks on the review application button 715. Referring to FIG. 8, there is shown one embodiment of a user confirmation interface. Once the review application button 715 is clicked, the content provider 185 is directed to a confirmation page 801 where the content provider 185 reviews the accuracy of the provided information prior to submitting the application via the submit application button 803.

Figure 3:
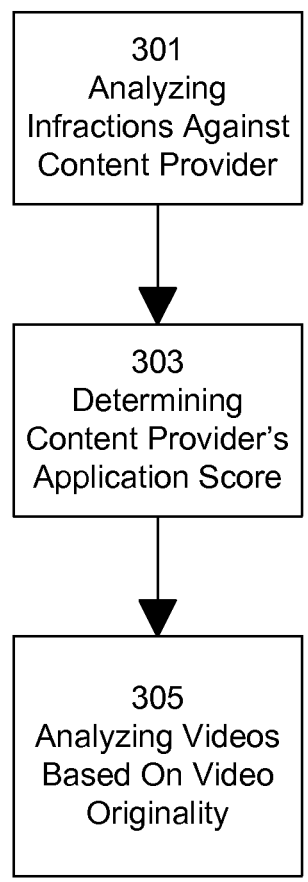
FIG. 3 illustrates a method for determining whether a content provider is eligible to become a revenue sharing partner in accordance with one embodiment of the present invention.

Referring back to FIG. 2, the second stage 203 is a process where the application analysis module 120 determines whether to allow the content provider 185 associated with the received revenue sharing partner application to participate in revenue sharing. FIG. 3 is representative of the steps performed by the application analysis module 120 in the second stage 203. The second stage 203 comprises the following functional steps to determine whether to admit the content provider 185 into the revenue sharing partner program:

301: Analyzing infractions against content provider;
303: Determining content provider's application score; and
305: Analyzing videos based on video originality.

Referring now to FIG. 9, there is shown a partner signup list user interface 901 that allows a system administrator of the video hosting website 100 to view information regarding various content providers 185 indicated in the Username column 903. Note that the partner signup list user interface 901 is merely illustrative of one embodiment and other arrangements of data collection and presentation may be used instead. The content providers 185 in the Username column 903 represent content providers 185 who have applied to the revenue sharing partner program. In step 301 (FIG. 3), the application analysis module 120 analyzes infractions accumulated by a content provider 185 applying to the revenue sharing partner program. Infractions are violations of the rules of conduct specified by the system administrator of the video hosting website 100. Infractions can lead to takedown requests being issued by a system administrator of the video hosting website 100 because a user of the video hosting website 100 flagged a video as inappropriate. For example, videos having inappropriate content can be classified as being sexually explicit, drug promotion (i.e., through drug usage), acts of animal cruelty, graphic violence or spam. Videos of this nature can be flagged as inappropriate by users and a take down request may be issued by the system administrator if the video is deemed inappropriate after being reviewed. Alternatively, a system administrator may issue a take down request without a video being flagged if a system administrator deems the video as inappropriate. The video is eventually removed from the video hosting website 100 if the take down request is validated.

Additionally, videos may be flagged as inappropriate because the content provider 185 is not authorized to use the content in the video. For example, television shows, music videos, music concerts or commercials should not be uploaded without permission from the owners of the content. Uploaded videos containing material not belonging to the uploading content provider may receive a takedown request because of a copyright violation.

When a takedown request is processed and a video is removed from the video hosting website 100, the content provider 185 associated with the video receives a strike against his or her account. Generally, a strike is a violation of the rules of the content hosting website that led to the removal of a video associated with a content provider 185 from the video hosting website 100. The strikes are accumulated in the content provider's account record stored in the user database 150. The strikes are generally classified under two categories: copyright strikes and miscellaneous strikes. Copyright strikes are issued if a video was removed from the video hosting website 100 because the content provider 185 did not own the material in the video. Thus, the content provider 185 received a copyright strike due to an alleged copyright violation.

Miscellaneous strikes can be issued due to videos being removed from the video hosting website 100. Videos are removed from the video hosting website 100 because a take down request may have been received indicating the video had inappropriate content. Additionally, miscellaneous strikes may be issued if other rules of conduct of the video hosting website 100 are violated. For example, if one content provider 185 is using an account of another content provider without proper consent, a miscellaneous strike may be issued. Additionally, if the content provider 185 is caught modifying part of the video hosting web site 100 without proper consent from a system administrator a miscellaneous strike may be issued.

The application analysis module 120 analyzes the strikes against a content provider 185 who has applied to become a revenue sharing partner by reviewing the content provider's account information in the user database 150 and extracting the number of copyright strikes and miscellaneous strikes against the content provider 185. In one embodiment, a summary of the strikes is included in a user interface 901 under the Strikes Ok column 905 so that a system administrator can review the information. The Strikes Ok column 905 comprises strike information such as the number of miscellaneous strikes 913 and the number of copyright strikes 911 against the content provider 185.

The Strikes Ok column also includes a textual symbol indicating a strike status 909 of the content provider 185. The strike status 909 indicates whether the content provider 185 has an amount of strikes against his/her account that is either tolerable or intolerable. A tolerable number of strikes indicate that the amount of strikes against a content provider 185 is not enough to justify the content provider 185 from being denied entry into the revenue sharing partner program. An intolerable number of strikes indicate that the amount of strikes against a content provider 185 is an indication that the content provider 185 may not be eligible for the revenue sharing partner program.

The textual symbol that indicates the strike status 909 will either be shown as a "Y" implying that the number of strikes against the content provider 185 is tolerable or a "N" implying that the number of strikes against the content provider 185 is not tolerable, for example. Any symbol can be used to represent the strike status 909.

In one embodiment, the tolerability of the number of strikes is dependent on the type of strike against the content provider 185. If the number of copyright strikes 913 that a content provider 185 received is greater than an intolerable threshold, such as one or more strikes (or two or more in some embodiments), the strike status would be "N" indicating that the number of copyright strikes 911 against the content provider 185 is intolerable. The number of strikes that would facilitate a strike status of "N" is reconfigurable and is determined by the system administrator of the video hosting website 100. In one embodiment, the content provider 185 is automatically denied from the revenue sharing partner program if the strike status was intolerable because the high number of copyright strikes indicates that the content provider 185 has a history of uploading copyrighted content. Alternatively, a system administrator may review the number of copyright strikes to determine whether the content provider 185 is still eligible to join the revenue sharing partner program.

If the number of copyright strikes 913 is equal to a tolerable threshold, such as one strike, then the application analysis module 120 reviews the information associated with the copyright strike that is stored in the user database 150 to determine the amount of time that has passed since the copyright strike was issued against the content provider 185. In one embodiment, if the copyright strike occurred more than a predefined number of years from the present date, than the strike status would indicate "Y" that the strike status is tolerable. For example, if the copyright strike occurred more than 2 years from the present date, the strike status would indicate "Y." In one embodiment, if the copyright strike occurred within a predefined number of years, the strike status would indicate "N" and the content provider 185 is automatically denied from the revenue sharing partner program.

The miscellaneous strikes 911 information is configured in a similar manner as the description relating to the copyright strikes 913. In one embodiment, the application analysis module 120 analyzes the number of copyright strikes 913 and miscellaneous strikes 911 to determine the strike status 909 against the content provider. Alternatively, the system administrator may analyze the copyright strikes 913 and miscellaneous strikes 911 and determine the strike status 909.

In step 303, receiving a revenue sharing partner application prompts the application analysis module 120 to determine the content provider's application score once the infractions against a content provider are analyzed. The partner signup list user interface 901 also includes a Final Score column 907. The Final Score column 907 indicates how valuable the content provider 185 is to the video hosting website 100. In one embodiment, the value of the content provider 185 is measured on a scale from 0.0 to 10.0 according to various criteria where a score of 10.0 indicates that the content provider 185 is a perfect candidate for the revenue sharing partner program and a score of 0.0 indicates that the content provider 185 is not eligible for the revenue sharing partner program.

The application analysis module 120 determines a final score, in one embodiment, for every content provider 185 who submits a revenue sharing partner application. The final score is determined using a final score algorithm comprised of the sum of weighted sub-scores, where each of the sub-scores is based on various criteria. The weighted sub-scores that are used to determine the final score, in on embodiment include subscribers sub-score, total views sub-score, views above 100 sub-score, views above 1000 sub-score, amount of videos sub-score, channel views sub-score, and user feedback sub-score.

The relationships of these sub-scores to each other in an exemplary embodiment is represented by the equation as follows:

finScore=0.3·subscribe+0.05·totViews+0.1·view100+
0.25·view1000+0.05·amtVid+0.15·chaView+
0.1·feedback where:
finScore=final score
subscribe=subscribers sub-score
totViews=total views sub-score
view100=views above 100 sub-score
view1000=views above 1000 sub-score
amtVid=amount of videos sub-score
chanView=channel views sub-score
feedback=user feedback sub-score In the above equation, the various weighting parameters preceding each sub-score are used for example purposes only and any weighting value for each of the sub-scores can be used as determined by the system administrator of the video hosting website 100.

In one embodiment, the subscribers sub-score is a measure of long term interest of the content provider's uploaded videos. A content provider 185 is capable of setting up a channel associated with his or her account where the channel is a web page illustrating only videos related to the content provider 185. Users of the video hosting website 100 can join the content provider's channel in order to view videos that the content provider 185 has uploaded. In one embodiment, users join the content provider's channel by providing contact information including an e-mail address to the content provider 185, so that users can be notified when new videos are uploaded to the channel by the content provider 185.

Once a user has joined a content provider's channel web page, the user is said to be subscribed to the channel. Being subscribed to a channel allows the user to view videos in the channel and to receive updates when new videos are posted. In one embodiment, users of the video hosting website 100 that are not subscribed are still able to view the content provider's channel, but are not allowed to view (i.e., load or watch) any of the videos in the channel. Alternatively, users of the video hosting website 100 that are not subscribed are able to watch the videos in the channel, but do not receive updates when new videos are uploaded to the channel.

The subscribers sub-score is calculated based at least in part on the number of subscribers (i.e., users who have joined the content providers channel). In one embodiment, the following variables are used in the equation representative of the calculation used to determine a raw subscriber sub-score found below:
rawSub=raw subscriber sub-score
numSub=number of subscribers The relationships of these variables to each other in an exemplary embodiment is represented by the equation as follows:

$$rawSub = \frac{\log\left(\frac{numSub}{20}\right)}{\log(10)}$$

For each of the sub-scores mentioned above, a raw sub-score is calculated that will be used in a sub-score algorithm to determine the sub-scores value. For exemplary purposes, a raw sub-score for each of the sub-scores mentioned above will be calculated and used in the calculation of an example final score for a content provider 185 who applied to become a revenue sharing partner. For example, assume that the number of subscribers to a content provider's channel is equal to 600. Using this value, the calculation of the raw subscriber sub-score using the above equation would result in a raw subscriber sub-score of 1.48. The raw subscriber sub-score will be later used in the calculation of the subscriber sub-score.

In one embodiment, the total views sub-score is the total number of views that the content provider 185 has received for his or her uploaded videos. The total number of views that the content provider 185 has received indicates the total interest that users of the video hosting website 100 have for the content provider's uploaded videos. In one embodiment, the following variables are used in the equation representative of the calculation used to determine a raw total views sub-score found below:
rawTotViews=raw total views sub-score
numViews=total number of views the content provider has received for his or her uploaded videos The relationships of these variables to each other in an exemplary embodiment is represented by the equation to determine the raw total views sub-score is as follows:

$$rawTotViews = \frac{\log\left(\frac{numViews}{10000}\right)}{\log(10)}$$

For exemplary purposes of a calculation of a final score, assume that the total number of views the content provider 185 has received for his or her uploaded videos is equal to 12,000 views. Using the above equation, the calculated raw total views sub-score is equal to 0.08. The raw total views sub-score will be later used in the calculation of the total views sub-score.

In one embodiment, the views above 100 sub-score measures the total interest in the content provider's uploaded videos with a slight emphasis on popularity. The following variables are used in the equation representative of the calculation used to determine a raw views above 100 sub-score:
rawViews100=raw views above 100 sub-score
numViews=total number of views the content provider 185 received for his or her uploaded videos
adjNumViews=numViews−100

In one embodiment, to determine the raw views above 100 sub-score, an adjusted value of the total number of views the content provider 185 has received for his or her uploaded videos is calculated as represented by the variable adjNumViews. Generally, to determine the adjusted value of the total number of views, in one embodiment a value of 100 is subtracted from the total number of views the content provider 185 has received for his or her uploaded videos. The value of 100 is used to determine a slight emphasis in popularity when determining the raw views above 100 sub-score. If the value of adjNumViews is still greater than a value of 0, the variable the adjNumViews will be set to the value. Since the adjusted number of total views is still a positive number, it is assumed that the content provider's video received enough views to indicate that his or her videos are slightly popular. Otherwise, the adjNumViews is equal to 0. The value of 100 is adjustable based on how much emphasis will be given on popularity and can be set to any value by the system administrator of the video hosting website 100. For example purposes to calculate a raw total views above 100 sub-score, using the total number of views the content provider 185 received for his or her uploaded videos of 12,000 views from the calculation of the raw total views sub-score, the adjusted number of views is 11,900 views. The adjusted number of views is used in the calculation of raw views above 100 as shown below.

The relationships of the above variables to each other in an exemplary embodiment is represented by the equation to determine the raw views above 100 sub-score is as follows:

$$rawViews100 = \frac{\log\left(\frac{adjNumViews}{10000}\right)}{\log(10)}$$

Using the above equation and the previously calculated adjusted number of views, the raw views above 100 sub-score is equal to 0.075. The raw views above 100 sub-score will be later used in the calculation of the views above 100 sub-score.

In one embodiment, the views above 1000 sub-score measures the total interest in the content provider's uploaded videos with a strong emphasis on popularity. The following variables are used in the equation representative of the calculation used to determine a raw views above 1000 sub-score:

rawViews1000=raw views above 1000 sub-score
numViews=total number of views the content provider 185 received for his or her uploaded videos
adjNumViews=numViews−1000

As previously discussed in regards to the calculation of the adjusted total number of views the content provider 185 has received for his or her uploaded videos in the calculation of the views above 100 sub-score, an adjusted total number of views must be calculated. The same calculation is performed in the determination of the adjusted total number of views except that a larger value is subtracted from the total number of views rather than a value of 100. For example, to adjust the value of the total number of views, a value of 1,000 is subtracted to determine the adjusted value of the total number of views that the content provider's videos have received. The value of 1000 is reconfigurable based on the amount of emphasis that will be given on popularity and can be set to any value by the system administrator of the video hosting website. Generally, after adjusting the total number of views that the content provider's videos have received, if the value is still a positive value than the content provider's videos are said to be popular and the adjNumViews is set to the positive value. Otherwise, the adjNumViews is set to zero. For example purposes to calculate a raw views above 1000 sub-score, using the total number of views the content provider 185 received for his or her uploaded videos of 12,000 views, the adjusted number of views is 11,000 views.

The relationships of the variables described above to each other in an exemplary embodiment is represented by the equation to determine the raw views above 1000 sub-score is as follows:

$$rawViews1000 = \frac{\log\left(\frac{adjNumViews}{10000}\right)}{\log(10)}$$

Using the above equation and the previously calculated adjusted number of views, the raw views above 1000 sub-score is equal to 0.04. The raw views above 1000 sub-score will later be used in the calculation of the views above 1000 sub-score.

In one embodiment, the amount of videos sub-score is factored into the final score as content providers 185 that have a large number of uploaded videos associated with their account are preferred. The amount of videos that the content provider 185 has uploaded can be extracted from the revenue sharing partner application that was previously described above. Alternatively, the application analysis module 120 can determine this amount from the content provider's account record in the user database 150. Generally, content providers 185 with a large number of uploaded videos have a potentially high revenue generating ability as they have a large number of videos which web advertisements can potentially be placed. Thus, content providers 185 with a large number of uploaded videos are preferred. For example, a content provider 185 with 30 uploaded videos would receive a higher amount of videos sub-score compared to a content provider 185 with only 5 uploaded videos. For example purposes to calculate a raw amount of videos sub-score, a content provider 185 with 30 uploaded videos will be used in the determination of the raw amount of videos sub-score.

The following variables are used in the equation representative of the calculation used to determine a raw amount of videos sub-score:

numVid=number of uploaded videos associated with the content provider
rawAmtVid=raw amount of videos sub-score The relationships of the above variables to each other in an exemplary embodiment is represented by the equation to determine the raw number of videos sub-score is as follows:

$$rawAmtVid = \frac{\log(numVid)}{\log(4)}$$

For the example of a content provider 185 with 30 uploaded videos, the raw amount of videos sub-score is equal to a value of 2.45 using the equation shown above. The raw amount of videos sub-score will later be used in the calculation of amount of videos sub-score.

In one embodiment, the channel views sub-score is calculated. As previously discussed, a content provider 185 is capable of setting up a channel associated with his or her account where the channel is a web page illustrating only videos related to the content provider 185. The channel views sub-score is calculated based at least in part on the number of views or hits a content provider 185 has received on his or her channel. The number of views (i.e., hits) represents the number of users of the video hosting website 100 who have viewed the content provider's channel. The number of views the channel has received is accumulated from both subscribers of the channel and from users that are not subscribed. Thus, when any user of the video hosting website 100 views the content provider's channel, the user's act of viewing the channel is considered a single view. The viewing information is accumulated each time a user of the video hosting website 100 views the content provider's channel and is stored in the content provider's account record in the user database 150.

The following variables are used in the equation representative of the calculation used to determine the channel views sub-score:

numChanViews=number of views (i.e., hits) a content provider has received on his or her channel rawChanViews=raw channel views sub-score The relationships of the above variables to each other in an exemplary embodiment is represented by the equation to determine the channel views sub-score is as follows:

$$rawChanViews = \frac{\log\left(\frac{numChanViews}{1000}\right)}{\log(10)}$$

For exemplary purposes, assume that a content provider 185 has received 13,000 views on his or her channel. Accordingly, the raw channel views sub-score calculated using the above equation is equal to a value of 1.11. The raw channel views sub-score will later be used in the calculation of the channel views sub-score.

In one embodiment, the feedback sub-score reflects the feedback that a content provider's videos have received from users of the video hosting website 100. Feedback can include a user providing a video rating such as rating one of the content provider's videos with a star rating of 5 out of 5 stars or users providing comments on a content provider's videos indicating that the user enjoyed the video. Additionally, feedback can include the number of instances users of the video hosting website 100 have bookmarked web pages containing the content provider's videos to a favorites category. The act of a user bookmarking a video indicates that the user may have enjoyed the video or found the video interesting enough to keep a record of the web page containing the video for future viewing. Videos that have been bookmarked in the user's favorites category are said to be favoritized. Each instance of a user bookmarking a video and the rating information provided by users is stored in the account record of the content provider 185 in the user database 150 that is associated with the bookmarked video.

The following variables are used to determine feedback scores pertaining to the feedback that each of the content provider's video has received:

numRatingStars=total number of rating stars that the content provider has received for his or her videos numRatings=total number of users who provided a video rating (i.e., rating stars)

numFav=sum of the total number of instances that each of the content provider's video has been favoritized.

The variables shown above are used in the equations below to determine various feedback scores as follows:

$$rawRatingSum = numRatingStars + (5 \cdot numFav)$$

$$ratingWeight = numRatings + numFav$$

$$ratingSum =$$
$$rawRatingSum - e^{\left(-\frac{ratingWeight}{1000}\right)} \cdot (rawRatingSum - (2.5 \cdot ratingWeight))$$

In one embodiment, the rawRatingSum is a score that is based at least in part on the amount of feedback received from users of the video hosting website 100 with a weighting factor associated with the total number of instances that each of the content provider's video has been favoritized. The weighting factor can be adjusted by the system administrator of the video hosting website 100 in order to adjust the effect of the videos which have been favoritized. Generally, the rawRatingSum is the total amount of feedback received from users of the video hosting website. In one embodiment, the ratingWeight is a score is based at least on the number of users of the video hosting website who have left feedback.

For exemplary purposes, assume that a content provider 185 received a total of 100 rating stars for his or her uploaded videos from 30 users of the video hosting website 100. Additionally, assume that a total number of 50 users of the video hosting website have favoritized a video associated with the content provider 185. Accordingly, the rawRating sum is equal to a value of 350 and the ratingWeight has a value of 80. Using these values, the calculated ratingSum is equal to a value of 211.5. The above feedback scores are then used as variables in the calculation of the raw feedback sub-score as follows:

$$rawFeedback = 2 \cdot \left(\frac{ratingSum}{ratingWeight}\right) - 6$$

For exemplary purposes, using the previously calculated feedback scores, the raw feedback sub-score is equal to a value of −0.7125. The raw feedback sub-score will later be used in the calculation of the feedback sub-score.

Each of the calculated raw sub-scores discussed above are now suitable to be used in the calculation of their respective sub-score. In one embodiment, any raw sub-score that has a value of less than zero, the corresponding sub-score is equal to zero. For example, in the calculation of the raw feedback sub-score, the calculated raw sub-score is equal to a value of −0.7125. Thus, the feedback sub-score is equal to zero. Otherwise, in one embodiment the following equation is representative of an equation used in the calculation of each sub-score:

$$\text{sub-score} = 20 \cdot \left(\frac{\alpha}{\alpha + 3}\right)$$

In the above equation, α is equal to any of the raw sub-scores that were previously described above. Each raw sub-score is used to calculate its respective sub-score, represented by the variable sub-score, using the equation above. For exemplary purposes, the previously calculated raw sub-scores are used to calculate example sub-scores for a content provider 185. Using the above equation and the previously calculated raw sub-scores, the calculated sub-scores are shown as follows:

| | Raw Sub-Score Value | Sub-Score Value |
|---|---|---|
| Subscribers sub-score | 1.48 | 6.61 |
| Total views sub-score | 0.08 | 0.52 |
| Views above 100 sub-score | 0.075 | 0.49 |
| Views above 1000 sub-score | 0.04 | 0.26 |
| Amount of videos sub-score | 2.45 | 8.99 |
| Channel views sub-score | 1.11 | 5.40 |
| Feedback sub-score | −0.7125 | 0 |

The above table is representative of the various sub-scores used in the calculation of the final score for a content provider 185. The table illustrates each sub-scores raw sub-score value and sub-score value. The sub-score values are then used in the calculation of the final score using the final score algorithm as was previously described:

$$finScore = 0.3 \cdot subscribe + 0.05 \cdot totViews + 0.1 \cdot view100 + 0.25 \cdot view1000 + 0.05 \cdot amtVid + 0.15 \cdot chaView + 0.1 \cdot feedback$$

Using the sub-score values shown in the table above, an example final score for a content provider 185 would be equal to a value of 3.38. In one embodiment, any content provider 185 that receives a final score less than a predetermined final score threshold value is automatically denied from joining the revenue sharing partner program. For example, a final score threshold could have a value of 6. Thus, the content provider 185 in the example above would be denied from joining the revenue sharing partner program as the content provider 185 did not receive a final score value indicating that the content provider 185 is eligible to become a revenue sharing partner. Alternatively, even though a content provider 185 received a final score value less than the predetermined threshold value, a qualitative judgment may be performed by a system administrator of the video hosting website 100 to determine if the content provider 185 should be invited to become a revenue sharing partner.

In one embodiment, content providers 185 who receive a final score greater than the predetermined final score threshold value will be automatically accepted in the revenue sharing partner program. Alternatively, content providers 185 who receive a score greater than the final score threshold will result in review of the content provider's uploaded videos to determine video originality. In an alternative embodiment, given multiple applicants who received a final score greater than the predetermined final score threshold, the applicant with the highest final score will have his or her uploaded videos analyzed to determine video originality, as will be further described below. Thus, the final score also indicates the priority of applicants for review.

Referring back to FIG. 3, in step 305 the application analysis module 120 analyzes videos uploaded by content providers 185 who have a final score 915 greater than the predetermined final score threshold and a tolerable strike status 909 value based on video originality. Original videos are considered videos to which the content provider 185 owns the copyrights and distribution rights for all audio and video content. In one example, a video uploaded by a content provider 185 illustrating the content provider 185 performing a cover song may not be considered original because the content provider 185 may not own the rights to the song.

Generally, the application analysis module 120 is in communication with the video analysis module 120 that compares each of the content providers' uploaded videos against videos stored in the video database 155 that are considered reference sources to determine if a content provider's video is original. The video analysis module 130 determines if a video is original by using known systems and methods for matching uploaded digital content items against reference sources, described for example in U.S. patent application Ser. Nos. 11/765,292 and 11/746,339, each of which is incorporated by reference herein.

In one embodiment, a certain percentage of the content provider's videos must be original in order for the video to be deemed original. The video analysis module 130 determines an originality percentage of the content provider's videos. The originality percentage indicates the percentage of the content provider's videos that are considered original. The originality percentage is compared to a predefined threshold percentage to determine whether the originality percentage of the content provider 185 is above the predefined threshold percentage. The video analysis module communicates the results to the application analysis module 120.

Generally, at this point in the revenue sharing partner application process, all videos being analyzed belong to content providers who have a final score 915 greater than the predetermined final score threshold value and a tolerable strike status 909. Content providers 185 who have an originality percentage greater than the predefined threshold percentage will be invited to the revenue sharing partner application process. Content providers 185 with an originality percentage less than the predefined threshold percentage will not be invited to the revenue sharing partner application process. Alternatively, a system administrator of the video hosting website 100 may determine whether content providers 185 with an originality percentage less than the predefined threshold percentage should still be invited to the revenue sharing partner application process.

In an alternative embodiment, a system administrator of the video hosting website 100 may review the videos uploaded by the content provider 185 to perform a qualitative judgment if the videos are original. The system administrator may review revenue sharing partner applications in an order based at least in part on the final scores of the received applications. The system administrator utilizes the final score values to properly allocate his or her time of reviewing applications of content providers 185 that would be the most valuable to the revenue sharing partner program. After the originality of the content provider's video is determined, the functional steps in stage 203 of the revenue sharing application process are complete.

Referring back to FIG. 2, in stage 205 of the revenue sharing partner application process, the content provider 185 who requested to join the revenue sharing partner program is notified of the decision whether he or she has been invited to become a revenue sharing partner. The notification may be in the form of an e-mail or a message in the content provider's account in the video hosting website 100. In an alternative embodiment, content providers 185 that did not request to become revenue sharing partners also receive an invitation. During predefined time intervals, the application analysis module 120 searches the user database 150 for all content providers 185 in the video hosting website 100. The application analysis module 120 performs the steps described above to determine content providers 185 that are eligible to become a revenue sharing partner. The eligible content providers 185 that are determined eligible to become a revenue sharing partner are also sent an invitation to become a revenue sharing partner.

To summarize, in one embodiment content providers 185 must meet the following criteria before being invited into the revenue sharing partner program: a tolerable number of strikes, a final score 915 above a predetermined final score threshold and a certain percentage of original videos. Content providers 185 that meet the criteria are accepted into the revenue sharing partner program. In an alternative embodiment, a system administrator of the video hosting website 100 may determine which combination of the criteria discussed above must be met in order to be invited into the revenue sharing partner program.

Figure 10:
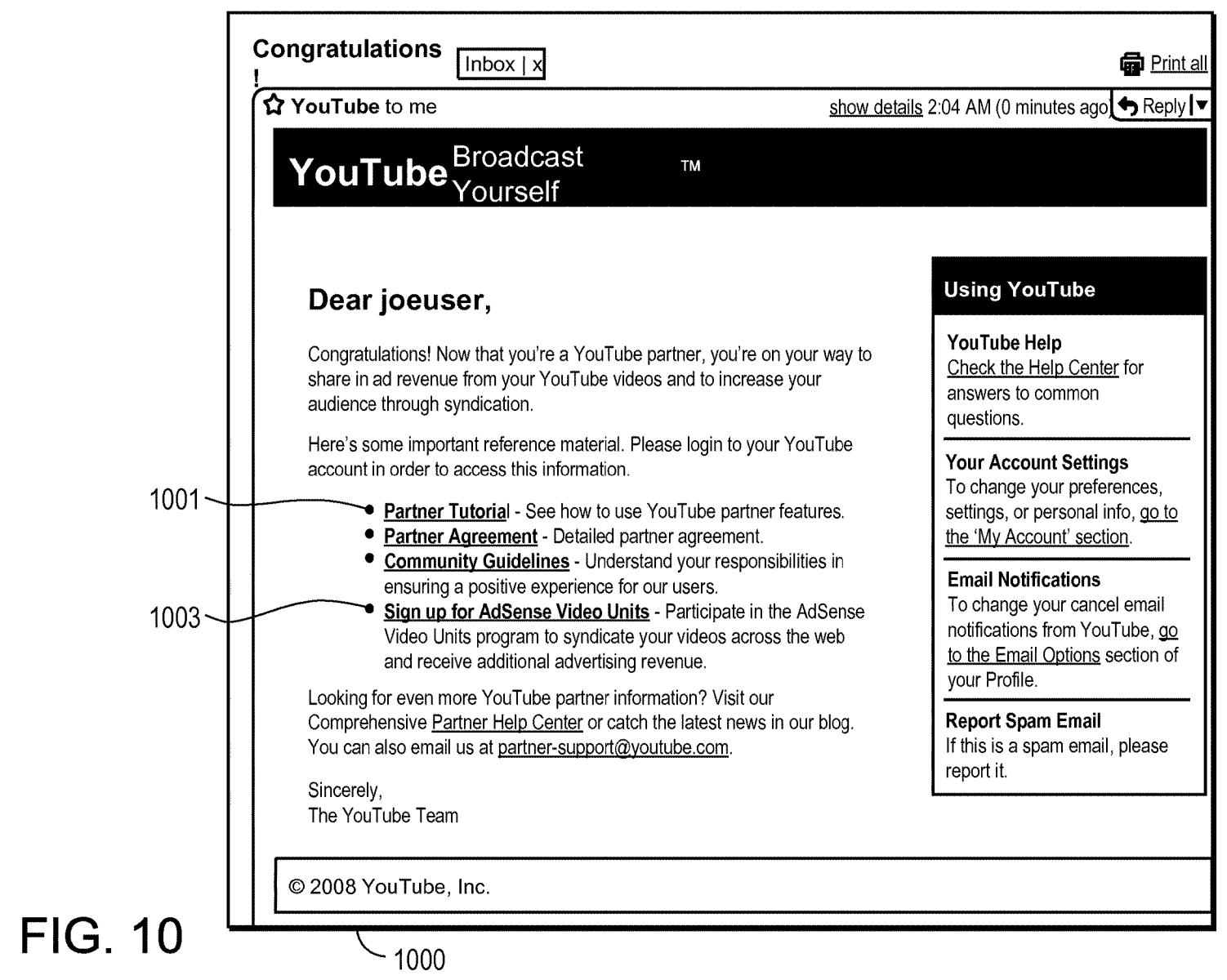

Content providers 185 that are invited into the revenue sharing partner program are sent a notification of the invitation as shown in invitation user interface 1000 in FIG. 10. FIG. 10 is one embodiment of an invitation user interface 1000 that indicates to the content provider 185 that they have been admitted in the revenue sharing partner program. The invitation user interface 1000 also includes important reference material for the new revenue sharing partner to review.

In one embodiment, all invited content provider 185 must complete a revenue sharing partner tutorial indicated by the partner tutorial link 1001. The revenue sharing partner tutorial helps newly initiated revenue sharing partners understand the revenue sharing partner program's key concepts such as how videos generate revenue, how to enable a video for revenue sharing and/or how to make sure that videos are eligible for revenue sharing.

In one embodiment, content providers 185 must also sign up for an advertisement serving program such as Google AdSense. Revenue sharing partners enroll in the advertisement serving program to allow web advertisements to be placed on their websites. In an alternative embodiment, revenue sharing partners are not required to have web advertisements placed on their websites through the advertisement serving program. Additionally, the advertisement serving program establishes a mechanism for receiving payments for revenue generated by the web advertisements placed in a revenue sharing partner's website. In a further embodiment, revenue sharing partners enroll in the advertisement serving program only to receive payment. As revenue sharing partners typically provide information such as bank information for receipt of payment or a residence or business address where the revenue sharing partner can receive payment, the enrollment in the advertisement serving program also enables the video hosting website 100 to verify the revenue sharing partner's identity since personal information such as bank information must be disclosed.

Once a newly invited revenue sharing partner has completed the revenue sharing partner tutorial and enrolled in an advertisement serving program, the revenue sharing partner's account is activated for revenue sharing and the revenue sharing partner application process is concluded. The revenue sharing partner is now able to monetize videos to receive shared revenue as will be further described below.

Video Monetization Process

The video monetization process is performed by the video analysis module 130 to determine if a video uploaded by a revenue sharing partner should be monetized. As previously discussed, a revenue sharing partner receives a share of the revenue generated from ad impressions occurring when monetized videos associated with the revenue sharing partner are viewed by users of the video hosting website 100.

Figure 4:
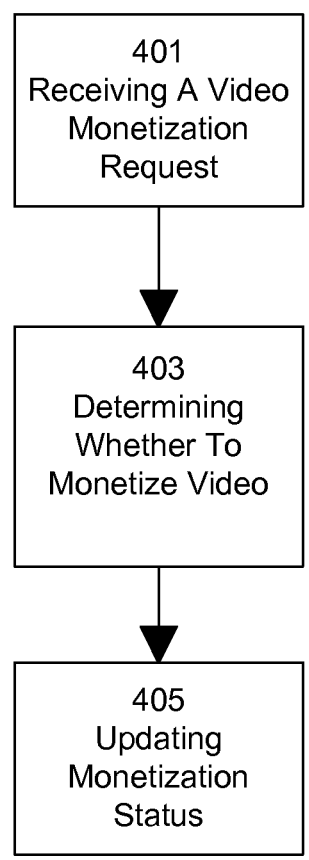
FIG. 4 illustrates a method for enabling monetization of a video in accordance with one embodiment of the present invention.

Referring now to FIG. 4, the video monetization process according to one embodiment has the following functional stages:

401: Receiving a video monetization request;
403: Determining whether to monetize video; and
405: Updating monetization status.

Figure 11:
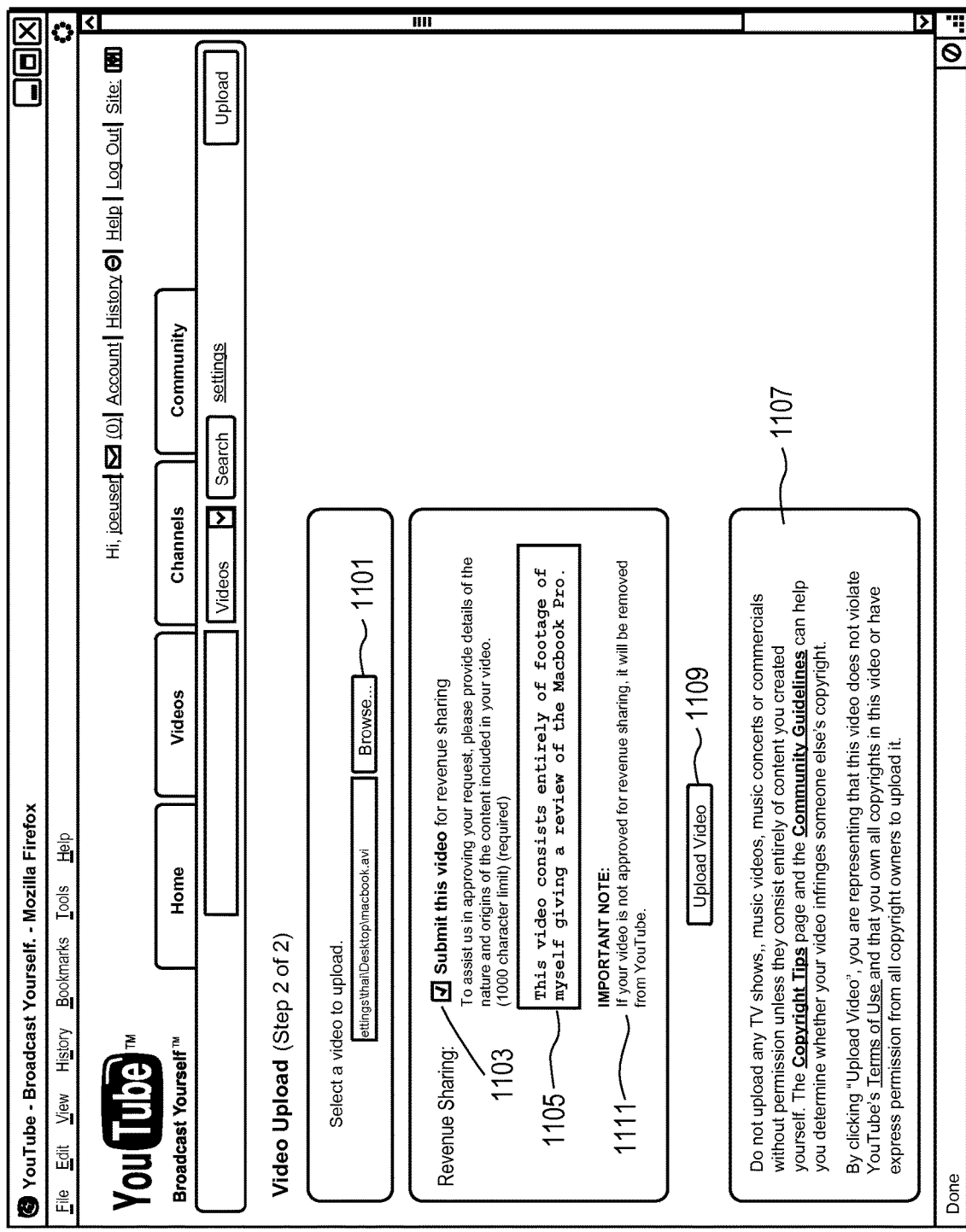
FIGS. 11-14 illustrate examples of user interfaces that are used by content sharing partners to review and upload videos for monetization in accordance with one embodiment of the present invention.

The first stage 401 entails receiving a request for monetization of a video. A request for monetization can be received when a revenue sharing partner uploads videos to the video hosting website 100. Referring to FIG. 11, there is shown an example video upload user interface 1100 in accordance with one embodiment of the present invention. A revenue sharing partner clicks the browse button 1101 to specify the file path of the video that the revenue sharing partner wishes to upload to the video hosting website 100. To enable monetization of the video, a revenue sharing partner must submit the video for revenue sharing (i.e., monetization). The revenue sharing partner clicks the revenue sharing checkbox 1103 to indicate that he or she is requesting that the video be approved for revenue sharing. Revenue sharing partners are not required to submit each video they upload to be enabled for revenue sharing. Revenue sharing partners that do not wish to enable a video for monetization simply specifies the file path of the video using the browse button 1101 and uploads the video to the video hosting website 100 using the upload video button 1109.

To assist in the approval of the request for revenue sharing of a video, revenue sharing partners provide details of the nature and origin of the content included in the video that is being uploaded in the notes field 1105. Generally, revenue sharing partners give explanations of the content of the video in the notes field 1105 that will be used in the evaluation of the video. Any information that revenue sharing partners can provide about the source of the music or visual images used in the uploaded videos will assist in the approval of the video for monetization. Additionally, a statement whether the music or visual images used in the video have been included with the permission of the source or the person appearing in the video will assist in the approval of the video for monetization. For example, a statement in notes field 1105 may be "This video consists entirely of footage of me giving a review of the Macbook Pro."

The video upload user interface 1100 includes a warning 1111 that indicates if the video being uploaded is not approved for revenue sharing, the video will be removed from the video hosting website 100. Revenue sharing partners run the risk of having their videos removed from the video hosting website 100 if the videos submitted for monetization are not approved. Revenue sharing partners are provided a general disclaimer 1107 that provides information regarding the type of content that should not be uploaded to the video hosting website. The general disclaimer 1107 assists in the decision if the video is eligible for revenue sharing. If the revenue sharing partner still wishes to submit the video for revenue sharing, the revenue sharing partner submits the video to the video hosting website 100 using the upload video button 1109.

After clicking the upload video button 1109, the video hosting website 100 receives the video and the ingest module 115 processes the video for storage in the video database 155 as previously discussed. Newly uploaded videos are made private so that only the revenue sharing partner who uploaded the video can view the video. In an alternative embodiment, newly uploaded video are made public to the users of the video hosting website 100, but the videos are not shown in conjunction with web advertisements.

Figure 12:
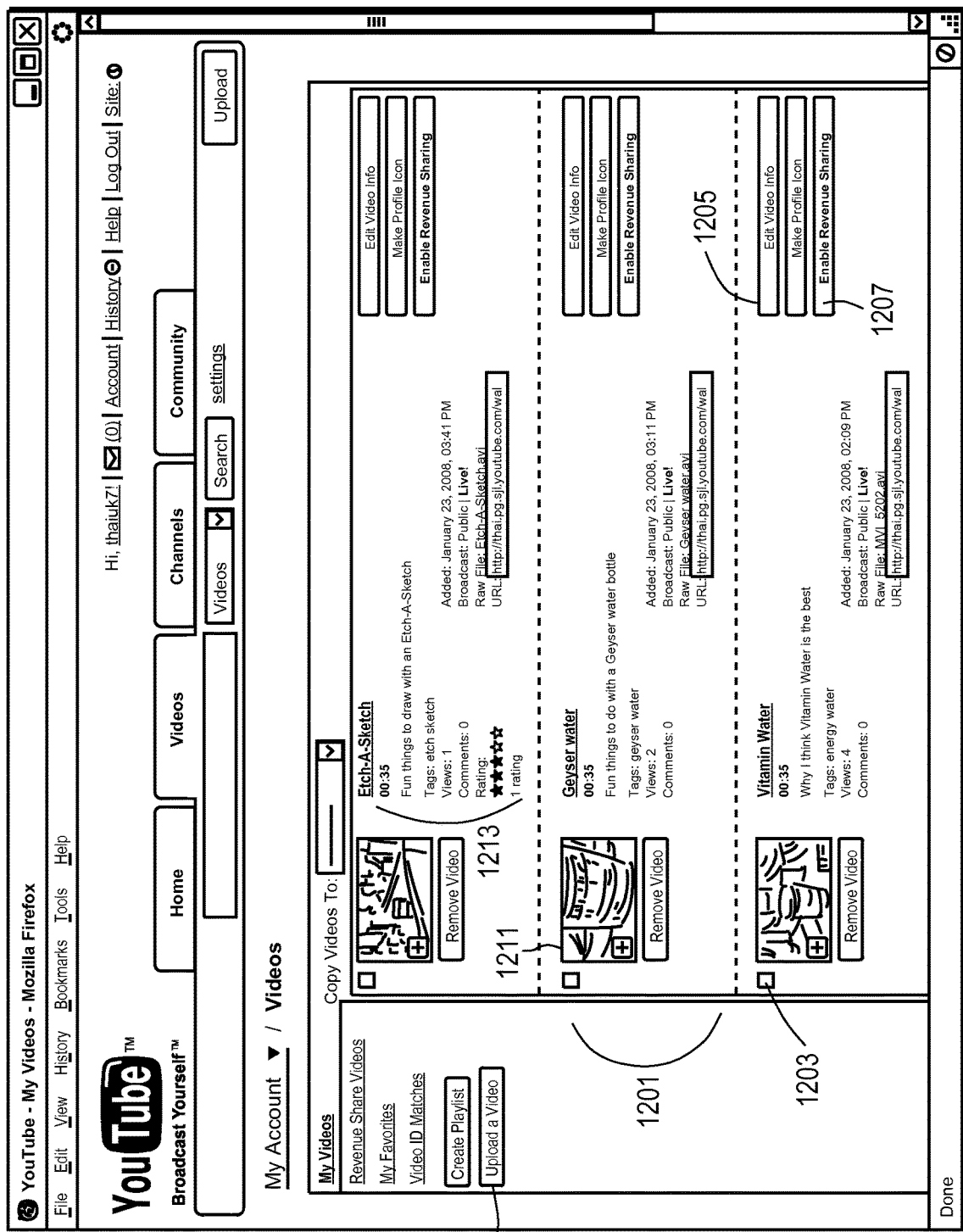

Alternatively, videos that were not initially submitted for revenue sharing or videos that the revenue sharing partner uploaded prior to being accepted in the revenue sharing partner program can be enabled for revenue sharing. Referring now to FIG. 12, there is shown an example of a revenue sharing partner's video user interface 1200 in one embodiment of the present invention. The video user interface 1200 illustrates to the revenue sharing partner videos which have not been enabled for monetization. The video user interface 1200 is comprised of one or more video rows 1201. A single video row is associated with a single video and comprises a video avatar 1211. The video avatar 1211 may be a still frame excerpt of the video or a moving frame excerpt. The video avatar 1211 assists the revenue sharing partner in the decision whether the video should be enabled for revenue sharing as the revenue sharing partner can see a portion of the content in the video. Additionally, revenue sharing partners can use the video user interface 1200 to upload videos to the video hosting website using the upload button 1209.

A video information section 1213 is also included in the video row 1201. The video information section 1213 illustrates general information associated with the video including video title, video length, URL link to the video on the video hosting website 100, date that the video was added to the video hosting website 100 and the raw file name. Revenue sharing partners are able to edit the video information section 1213 using the edit video info button 1205.

More importantly, the video information section 1213 includes feedback information from users of the video hosting website 100. The feedback information includes the average star rating, the number of views the video received and the number of comments the video received. This feedback information indicates to the revenue sharing partner if the video is a good candidate for monetization as a video with a large number of views can potentially generate more revenue compared to a video with a lower number of views, for example.

Figure 13:
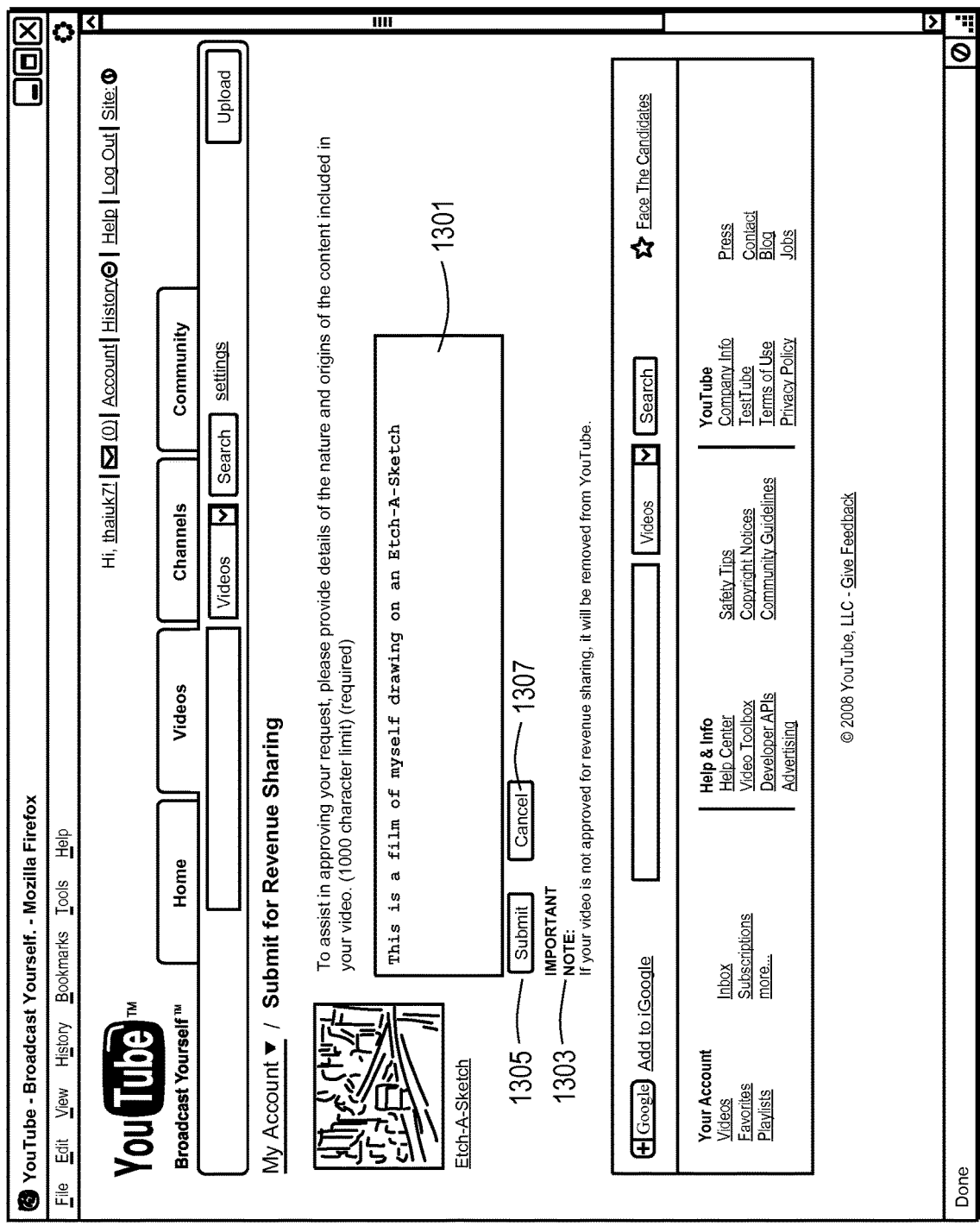

After reviewing the videos in the video user interface 1200, a revenue sharing partner can indicate that he or she wants to submit a video for monetization. Each video row 1201 includes a video checkbox 1203. The video checkbox 1203 is used to indicate which video will be enabled for revenue sharing. Additionally, each video row 1201 includes an enable revenue sharing button 1207. The enable revenue sharing button is pressed if a revenue sharing partner wants to request a particular video be monetized. For example, a revenue sharing partner can click on the checkbox that is associated with the video that will be enabled for revenue sharing and press the enable revenue sharing button that is associated with the checkbox. After clicking on the enable revenue sharing button 1207, the revenue sharing partner is directed to a video confirmation user interface 1300 as shown in FIG. 13.

The video confirmation user interface 1300 allows revenue sharing partners to provide details of the nature and origin of the content included in the video that is being uploaded in the notes field 1301. These details will assist in the approval of the request, as was previously discussed with regard to videos that were enabled for monetization during their initial upload. Revenue sharing partners are displayed a warning 1303. The warning 1303 indicates to revenue sharing partners that they risk having their videos, which are already publically displayed, removed from the video hosting website 100 if the videos are not approved. Revenue sharing partners who do not want to risk having their videos removed may click the cancel button 1307. Revenue sharing partners that still wish to have their video enabled for monetization can click on the submit button 1305.

Figure 5:
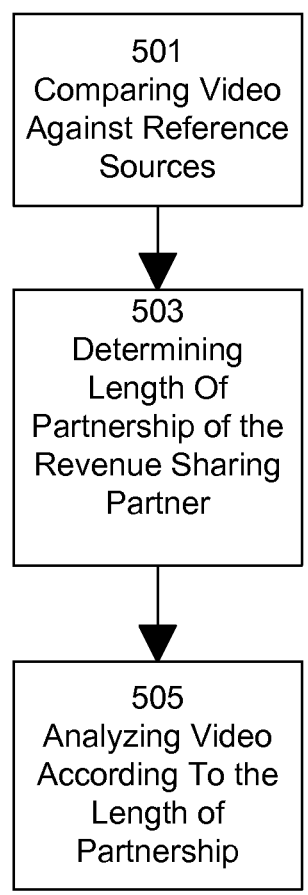
FIG. 5 illustrates a method for analyzing a video to determine whether the video should be enabled for monetization in accordance with one embodiment of the present invention.

Once the revenue sharing partner has submitted a request for monetization of a video to the video hosting website 100, the video must be reviewed prior to being enabled for monetization. The second stage 403 of the video monetization process determines whether to monetize a video that has been requested for monetization. FIG. 5 is representative of the steps performed by the video analysis module 130 in the second stage 403. The second stage 403 comprises the following functional steps to determine whether a video should be monetized to allow a revenue sharing partner to receive revenue generated by web advertisements shown with the monetized video:

501: Comparing video against reference sources;
503: Determining length of partnership of the revenue sharing partner; and
505: Analyzing video according to the length of partnership.

In the first step 501, the submitted video is compared against reference sources. The video analysis module 130 compares videos that have been submitted for monetization against reference sources to ensure that the videos are original. Original videos are considered videos which the content provider 185 owns the copyrights and distribution rights for all audio and video content that is uploaded. For example, a video illustrating a person drawing a picture of a Ferrari on an Etch-A-Sketch toy may be considered an original video. In another example, a video uploaded by a content provider 185 illustrating the content provider 185 performing a cover song may not be considered original because the content provider 185 may not own the rights to the song. As previously described above, the video analysis module 130 utilizes systems and methods for matching uploaded digital content items against reference content are known, and some are described for example in U.S. patent application Ser. Nos. 11/765,292 and 11/746,339, each of which is incorporated by reference herein.

In one embodiment, videos that are matched to a reference source by the video analysis module 130 are automatically denied being monetized. The revenue sharing partner that submitted the request for monetization of the denied video is notified that the video has been denied and that the video will be removed from the video hosting website 100. In an alternative embodiment, videos that are matched to a corresponding reference source are manually reviewed by a system administrator of the video hosting website 100. The system administrator will make the decision whether the video contains original content.

In step 503, the length of partnership of the revenue sharing partner is determined. If a video did not match any reference source, the amount of time the revenue sharing partner has been part of the revenue sharing partner program is determined. In one embodiment, the length of partnership dictates if an analysis is performed on the video submitted for monetization. The video analysis module 130 determines the length of partnership of the revenue sharing partner requesting monetization of a video by extracting the information from the revenue sharing partner's account record stored in the user database 150. Once the partnership length is determined, the video analysis module can begin to analyze the video.

In step 505, videos submitted for monetization that did not match any reference source are analyzed. The video analysis module 130 reviews video information related to the video submitted for monetization along with the strike status of the revenue sharing partner. As previously discussed, a revenue sharing partner may receive strikes to his or her account if a take down request of one of the revenue sharing partner's videos is processed. The video analysis module 130 reviews the infraction information stored in the account record of the revenue sharing partner in the user database 150. Revenue sharing partners must maintain proper behavior and follow the rules of conduct of the video hosting website 100 if they wish to have their videos monetized. In one embodiment, the number of strikes against the revenue sharing partner since they joined the revenue sharing partner program is analyzed. In one embodiment, if the revenue sharing partner has received a strike against his or her account, videos submitted for monetization are automatically rejected and removed from the video hosting website 100. In an alternative embodiment, if the revenue sharing partner has a number of strikes greater than a predefined strike threshold, the video is automatically rejected for monetization and removed from the video hosting website. The predefined strike threshold can be set by a system administrator of the video hosting website 100 to determine the number of strikes a revenue sharing partner may receive that will prevent monetization of a video. In an alternative embodiment, a system administrator can manually review the strike status of the revenue sharing partner to aid in the determination if the video submitted by the revenue sharing partner should be monetized. If the revenue sharing partner did not receive any strikes against his or her account, video information related to the video is reviewed as further described below.

In one embodiment, video information includes feedback information such as the number of views a video received, the number of rating stars a video has received or the number of users that have rated the video. Generally, the feedback information is compared to a feedback threshold associated with the particular type of feedback information. The number of views a video received indicates to the video analysis module 130 the popularity of the video. The video analysis module 130 retrieves the number of views a video has received from the video record in the video database 155 and compares the number of views to a predefined popularity threshold. Videos which receive an amount of views greater than the popularity threshold are considered popular. In one embodiment, popular videos are automatically monetized as long as the revenue sharing partner did not have a strike status above the strike threshold. Popular videos are automatically monetized since popular videos can potentially generate a large amount of revenue since many users view these videos.

The number of rating stars a video has received and the number of users that have rated the video indicates the quality of the video and can be used to determine an average rating of the video. Videos that have an average star rating greater than a predefined average star rating threshold may be allowed to be monetized. For example, videos with an average star rating of 4 out of 5 stars are allowed to be monetized. Videos with an average star rating greater than the star rating threshold are said to be quality videos. Quality videos are generally enjoyed by users of the video hosting website 100 and are monetized as there is generally a correlation between the quality of a video and the number of views a video receives. For example, videos with a high quality rating generally have a high number of views or may eventually receive a high number of views through word of mouth of the users of the video hosting website 100. Users may inform other users of the quality videos by posting the video on websites 175 other than the video hosting website or by sending the URL link of the quality video to other users.

Videos undergo the analysis described above depending on the length of partnership of the revenue sharing partner who submitted the video that was determined in step 503. The amount of time a revenue sharing partner has been part of the revenue sharing partner program dictates whether his or her videos undergo the analysis described above. In one embodiment, the length of time that the revenue sharing partner has been part of the revenue sharing partner program dictates whether a video from a revenue sharing partner will be reviewed. The length of time is compared against various defined time intervals to determine whether a video should be analyzed.

In one embodiment, within a first length of time that a revenue sharing partner joined the revenue sharing partner program, every video submitted by the revenue sharing partner is analyzed as described above. For example, within the first two months that a revenue sharing partner joined the revenue sharing partner program, every video submitted by the revenue sharing partner is analyzed. New revenue sharing partners have not established any credibility as a revenue sharing partner. Thus, every video of new revenue sharing partners must be analyzed. Revenue sharing partners must follows the rules of the video hosting website 100 and only upload original content in order to gain credibility on the video hosting website 100.

In one embodiment, after a second length of time of becoming a revenue sharing partner, all videos uploaded by the revenue sharing partner are automatically monetized. At this point, the revenue sharing partner has gained enough credibility that his or her videos no longer need to be analyzed for monetization. For example, every video submitted after the third month since the revenue sharing partner joined the revenue sharing partner program is automatically approved. In order to ensure revenue sharing partners are still abiding by the rules of the video hosting website 100, the analysis discussed above may be performed on a yearly basis, for example, to ensure that the revenue sharing partner is not abusing his or her credibility. The time intervals mentioned above are merely exemplary of time intervals that can be used in the determination to monetize a video. Any suitable time interval can be used as determined by the system administrator of the video hosting website 100.

In one embodiment, videos submitted between the first length of time and the second length of time that a revenue sharing partner joined the revenue sharing partner program are not always analyzed. Only a certain percentage of videos submitted for monetization are analyzed. For example, during the third month of becoming a revenue sharing partner, only 75% of videos submitted by the revenue sharing partner are reviewed for monetization. At this point, the revenue sharing partner has gained credibility since the revenue sharing partner has shown during the first two months of partnership that he or she can abide by the rules of the video hosting website and only upload original videos.

In one embodiment, a prevention mechanism is implemented to prevent videos from automatically being monetized from revenue sharing partners who did not request any videos for monetization up to the second length of time. The video analysis module 130 reviews the number of requests of monetization since the time when the revenue sharing partner joined the revenue sharing partner program up until the second length of time. If the revenue sharing partner did not submit any requests for monetization up until the second length of time, the revenue sharing partner's videos are analyzed by the video analysis module 130 regardless if they are submitted after the second length of time.

Referring back to FIG. 4, during the third stage 405 of the video monetization process, the video analysis module 130 updates the monetization status of videos submitted for monetization. The account records in the video database 155 of videos that have been enabled for monetization are updated to indicate that the videos are capable of generating revenue through placement of web advertisements shown on pages including the monetized video. Videos which have been denied are deleted from the video database 155.

Figure 14:
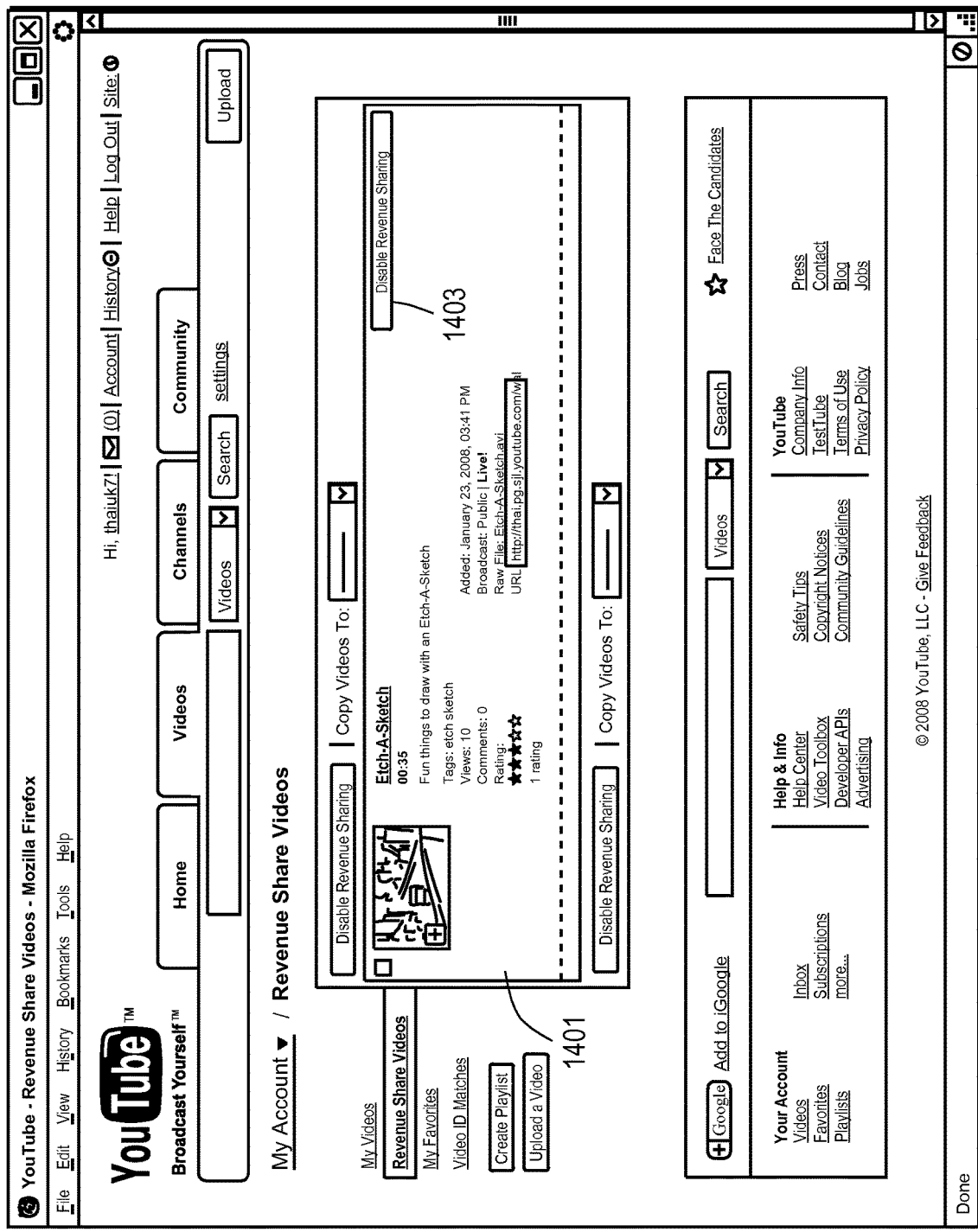

In one embodiment, videos which have been monetized are removed from the video user interface 1200 and are placed in the revenue sharing videos user interface 1400 as shown in FIG. 14. The revenue sharing videos user interface 1400 illustrates all the monetized videos associated with the revenue sharing partner. Revenue sharing partners may view all their monetized videos and can decide to disable the video for revenue sharing. The revenue sharing videos user interface 1400 is similar to the video user interface 1200.

The revenue sharing videos user interface 1400 comprises video rows 1401 that is associated with a single video and comprises the same features described in the video user interface 1200. In addition, the revenue sharing videos user interface 1400 comprises a disable revenue sharing button 1403. Revenue sharing partners may disable videos from receiving revenue if they decide to remove the video from the video hosting website 100 or for any other appropriate reason.

Revenue Generation

Figure 15:
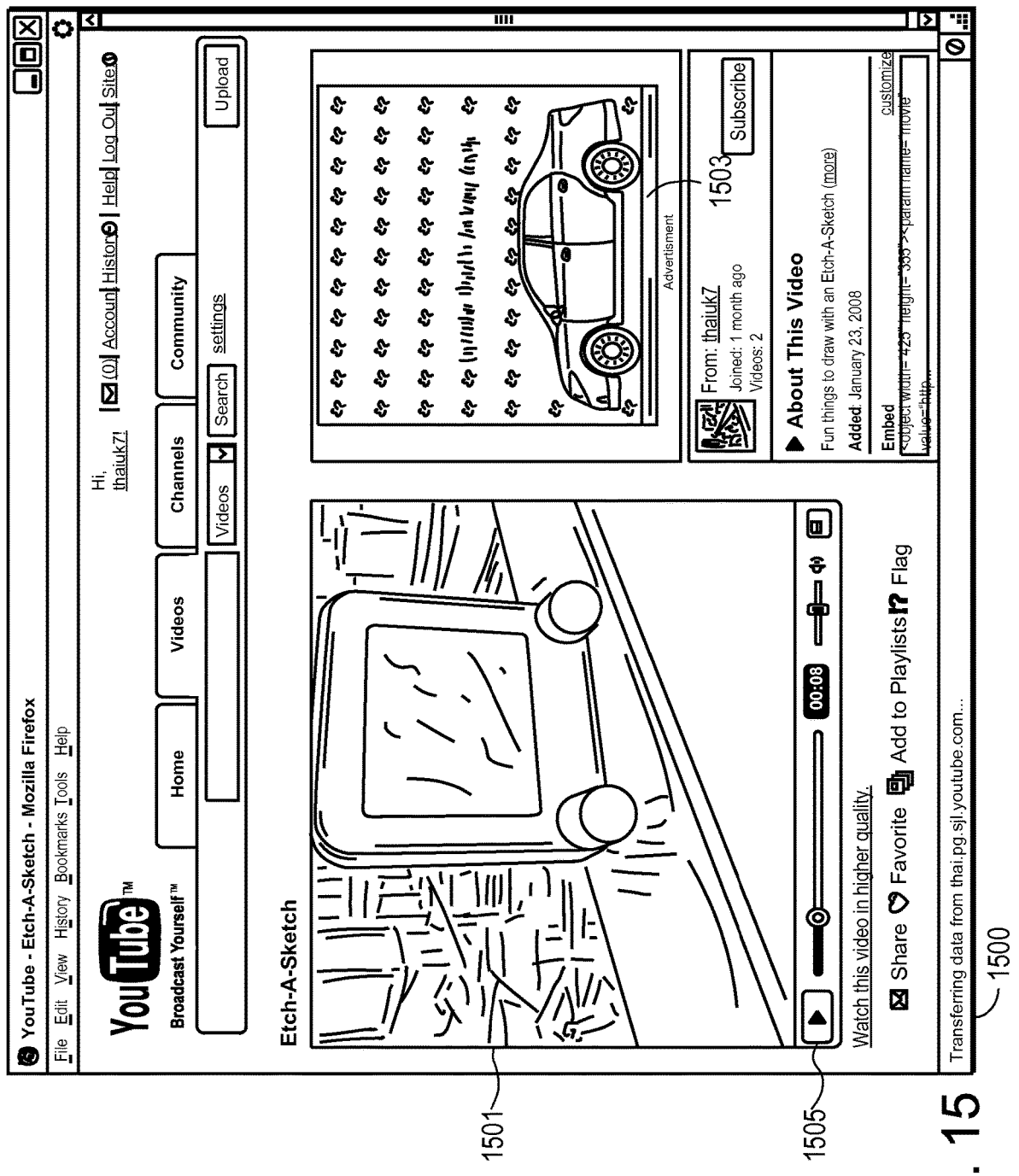
FIG. 15 illustrates an example of a user interface illustrating a monetized video and an associated web advertisement that generates revenue in accordance with one embodiment of the present invention.

Videos which have been enabled for monetization are displayed in conjunction with a web advertisement. Referring to FIG. 15, there is shown an example video display user interface 1500 according to one embodiment. The video display user interface 1500 comprises a monetized video shown in the display region 1501. Additionally, a web advertisement 1503 is shown in conjunction with the monetized video. Revenue sharing partners generate revenue (i.e., money) from the web advertisements 1503 shown in conjunction with their monetized video. The method that revenue is generated depends on the type of web advertisement displayed with the monetized video. The amount of revenue generated by revenue sharing partners is tracked by the revenue generation module 135. The different types of advertisements and how these types of advertisements generate revenue will now be described.

As shown in the revenue sharing videos user interface 1400, in one embodiment the web advertisement 1503 is placed to the right of the monetized video. Web advertisements that are placed outside of the monetized video, such as web advertisement 1503 in FIG. 15, are considered external web advertisements as they are displayed separately from the monetized video. Additionally, pop-ups or web advertisements that automatically appear in a new web page may appear after the monetized video has finished playing. Pop-ups are also considered external web advertisements. Pop-ups may also appear automatically after a monetized video begins playing or after a certain duration of the video has passed. Additionally, pop-ups may appear as a result of a user clicking on web-advertisements that are placed outside of the monetized video. Users would be displayed additional web advertisements pertaining to the web advertisement that was clicked. For example, web advertisement 1503 displays an advertisement of a new automobile. If a user clicks on the web advertisement 1503, a new web page would be displayed containing another web advertisement of the same automobile or other automobiles of the same make.

Web advertisements need not be shown in a separate area from the monetized video as shown in the video display user interface 1500. Web advertisements displayed in the display region 1501 with the monetized video are considered internal web advertisements. In one embodiment, when a user starts to view a video by pressing the play button 1505, an advertisement will be played somewhere in the video display region 1501 that does not obstruct the viewing of the content of the video. The web advertisement is essentially overlaid onto the video content. For example, the advertisement may be placed on the bottom right corner of the monetized video or somewhere along the bottom edge of the monetized video so not to obstruct the video content. Alternatively, a web advertisement may be played in the display region 1501 prior to the playback of the monetized video. For example, if a user clicks on the play button 1505, a web advertisement would be displayed prior to the monetized video being displayed. A web advertisement also may be played in the display region 1501 after the duration of the monetized video has elapsed.

Revenue sharing partners may generate revenue in various ways. In one embodiment, revenue may be generated based on payment per view. For external web advertisements which merely are displayed separately from the monetized video, a revenue sharing partner may generate revenue each time the web advertisement is shown in conjunction with the monetized video. External web advertisements such as pop-ups that appear automatically after a monetized video begins playing or after a certain duration of the video has passed also can generate revenue each time the pop-up appears. For internal web advertisements, a revenue sharing partner may generate revenue as long as a portion of the monetized video is played. In an alternative embodiment, a revenue sharing partner may only generate revenue if the duration of the entire web advertisement is played.

The revenue generation module 135 tracks the number of views the monetized video received from users of the video hosting website 100. The number of views is tracked as the number of views a video received correlates to the number of times a web advertisement was viewed. Using the number of views value the monetized video received, the revenue generation module 135 can calculate the revenue generated based on a rate per view value. The rate per view value may be set by the system administrator of the video hosting website 100 or may be automatically set by the application analysis module 120 when the revenue sharing partner was invited into the revenue sharing program. For example, a revenue sharing partner may have a rate per view value of $0.001 for every view. The revenue generation module 135 may determine that a revenue sharing partner has received a total of 1,000 views for all his or her monetized videos. Thus, the revenue sharing partner will have generated $1.00 from his or her monetized videos in one example.

In one embodiment, the rate per view is the same for every revenue sharing partner. A set rate per view value may be determined by the system administrator depending on the length of partnership of a revenue sharing partner. In an alternative embodiment, the rate per view is based on the length of partnership. Revenue sharing partners who have been part of the revenue sharing partner program for a determined length of time will have a higher rate per view compared to newly joined revenue sharing partners. Thus, the rate per view value of each revenue sharing partner will increase as their length of partnership increases.

In another embodiment, revenue may be generated based on payment per click. External web advertisements such as pop-ups generate revenue each time a user of the video hosting website 100 clicks on an external web advertisement such as web advertisement 1503. Clicking of web advertisement 1503 would cause a web page containing another web advertisement to be played. The revenue generation module 135 tracks the number of times users of the video hosting website 100 clicks on web advertisements shown in monetized videos associated with each of the revenue sharing partners. For revenue generated by payment per click, each revenue sharing partner is assigned a rate per click value. The rate per click value is similar to the rate per view value. The rate per click value may be set by the system administrator of the video hosting website 100 or may be automatically set by the application analysis module 120 when the revenue sharing partner was invited into the revenue sharing program. Like the rate per view, the rate per click may be the same for every revenue sharing partner or may be different depending on the length of partnership of the revenue sharing partner.

In an alternative embodiment, revenue sharing partners may receive a share percentage of revenue generated by web advertisements placed in conjunction with their monetized videos. Companies may negotiate a flat payment to the owners of the video hosting website 100 for displaying their web advertisements. Revenue sharing partners that display web advertisements of that company would receive a percentage of the revenue that the owners of the video hosting website 100 received. For example, assume that a company paid the owners of the video hosting website $10,000 to host their advertisements and 1,000 revenue sharing partners display those web advertisements. Thus, each revenue sharing partner generated $10 of revenue for displaying the company's web advertisements. The revenue sharing partners would only receive a set percentage of the generated revenue. For example, the set percentage may be 50% of the revenue generated, thus each revenue sharing partner would receive $5.00.

Alternatively, companies may negotiate a rate per view or rate per click scheme as described above and revenue sharing partners may receive a percentage of the revenue generated that is shared with the owners of the video hosting website 100. For example, assume that the company negotiated with the owners of the video hosting website a rate of $1 per view of the company's commercials. If a revenue sharing partner received 100 views of the company's commercials, the revenue sharing partner generated $100. The generated revenue is then shared with the owners of the video hosting website 100 based on a share percentage. The share percentage may be a fixed value for all revenue sharing partners or may be different depending on the length of partnership as previously described.

The features described herein beneficially provide a system and method to admit content providers of a video hosting website into a revenue sharing partner program where the content providers may submit videos for monetization in order to generate shared revenue. Revenue sharing allows content providers to receive compensation for their original videos.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for collaboratively ranking a set of digital content items through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method to categorize video content providers, comprising:
  receiving, by one or more computing devices, a request from a provider of video content to receive content items to present in conjunction with video content presented by the video content provider;
  analyzing, by the one or more computing devices, a set of video content presented by the video content provider;
  determining, by the one or more computing devices, that the set of video content has a minimum number of viewers and meets a standard for upload content; and
  in response to determining that the set of video content has the minimum number of viewers and meets the standard for upload content and originality and based on a video upload frequency of the provider of the video content, communicating, by the one or more computing devices, a content item to the video content provider to present in conjunction with video content.

2. The computer implemented method of claim 1, wherein the video content items are determined to be original based on a digital fingerprinting of the video content items.

3. The computer implemented method of claim 1, further comprising transferring, by the one or more computing devices and to the video content provider, a portion of received revenue from the content item.

4. The computer implemented method of claim 1, wherein the content item is presented by the video content provider at a time before the video content provider presents the video content.

5. The computer implemented method of claim 4, wherein the request is received as an online application.

6. The computer implemented method of claim 5, wherein the revenue is generated when a certain number of viewers are presented the content item.

7. The computer implemented method of claim 4, wherein the revenue is generated when a viewer clicks on the content item.

8. The computer implemented method of claim 1, wherein the revenue is generated when a viewer takes an action based on the content item.

9. The computer implemented method of claim 1, wherein the standard for upload content is based on a number of violations of a set of conduct rules established by the one or more computing devices.

10. The computer implemented method of claim 1, wherein the standard for upload content is based on a number of video content items submitted by the provider.

11. The computer implemented method of claim 1, wherein the standard for upload content is based on a number of video content items that are determined to be original.

12. The computer implemented method of claim 1, further comprising:
  determining, by the one or more computing devices, that the set of video content has been viewed for a minimum cumulative amount of time; and
  in response to determining that the set of video content has been viewed for the minimum cumulative amount of time, communicating, by the one or more computing devices, a content item to the video content provider to present in conjunction with video content.

13. A computer program product, comprising:
  a non-transitory computer-readable storage device having computer-executable program instructions embodied thereon that when executed by a computer cause the computer to categorize video content providers, the computer-executable program instructions comprising:
  computer-executable program instructions to receive a request from a provider of video content to receive content items to present in conjunction with video content presented by the video content provider;
  computer-executable program instructions to analyze a set of video content presented by the video content provider;
  computer-executable program instructions to determine that the set of video content has a minimum number of viewers and meets a standard for upload content; and
  computer-executable program instructions to communicate a content item to the video content provider to present in conjunction with video content in response to determining that the set of video content has the minimum number of viewers and meets the standard for upload content and originality and based on a video upload frequency of the provider of the video content.

14. The computer program product of claim 13, wherein the video content items are determined to be original based on a digital fingerprinting of the video content items.

15. The computer program product of claim 13, further comprising transferring, by the one or more computing devices and to the video content provider, a portion of received revenue from the content item.

16. The computer program product of claim 13, wherein the content item is presented by the video content provider at a time before the video content provider presents the video content.

17. A system to categorize video content providers, comprising:
  a storage device;
  a network device; and
  a processor communicatively coupled to the storage device and the network device, wherein the processor executes application code instructions that are stored in the storage device to cause the system to:
    receive a request from a provider of video content to receive content items to present in conjunction with video content presented by the video content provider;
    analyze a set of video content presented by the video content provider;
    determine that the set of video content has a minimum number of viewers and meets a standard for upload content; and
    communicate a content item to the video content provider to present in conjunction with video content in response to determining that the set of video content has the minimum number of viewers and meets the standard for upload content and originality and based on a video upload frequency of the provider of the video content.

18. The system of claim 17, wherein the content item is presented by the video content provider at a time before the video content provider presents the video content.

19. The system of claim 17, wherein the request is received as an online application.

20. The system of claim 17, wherein the revenue is generated when a viewer clicks on the content item.

* * * * *